(12) United States Patent
Kubota

(10) Patent No.: US 7,791,764 B2
(45) Date of Patent: Sep. 7, 2010

(54) IMAGE PROCESSING METHOD AND APPARATUS, IMAGE READING APPARATUS, AND IMAGE FORMING APPARATUS DETECTING PLURAL TYPES OF IMAGES BASED ON DETECTING PLURAL TYPES OF HALFTONE DOT AREAS

(75) Inventor: Kazuhisa Kubota, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 1029 days.

(21) Appl. No.: 11/520,976

(22) Filed: Sep. 13, 2006

(65) Prior Publication Data

US 2007/0058211 A1 Mar. 15, 2007

(30) Foreign Application Priority Data

Sep. 14, 2005 (JP) ............... 2005-266987
Jun. 30, 2006 (JP) ............... 2006-182721

(51) Int. Cl.
*H04N 1/40* (2006.01)
*H04N 1/403* (2006.01)
(52) U.S. Cl. .................. 358/2.1; 358/3.06; 358/3.21
(58) Field of Classification Search .............. 358/1.9, 358/2.1, 3.06, 3.14, 3.21, 3.23, 534, 448, 358/462; 382/173, 176
See application file for complete search history.

(56) References Cited

U.S. PATENT DOCUMENTS

| | | | | | |
|---|---|---|---|---|---|
| 5,384,647 | A | * | 1/1995 | Fukushima | 358/2.1 |
| 6,975,819 | B2 | * | 12/2005 | Katamoto | 399/82 |
| 2006/0238814 | A1 | * | 10/2006 | Murakami | 358/3.14 |

FOREIGN PATENT DOCUMENTS

| | | |
|---|---|---|
| JP | 10-126631 | 5/1998 |
| JP | 2002-232709 A | 8/2002 |
| JP | 2004-248103 | 9/2004 |
| JP | 2004-297212 A | 10/2004 |
| JP | 2005-101765 A | 4/2005 |

* cited by examiner

*Primary Examiner*—Scott A Rogers
(74) *Attorney, Agent, or Firm*—Edwards Angell Palmer & Dodge LLP; David G. Conlin; Peter J. Manus

(57) ABSTRACT

An image processing apparatus includes an automatic document type discrimination section for estimating a type of input image data. The automatic document type discrimination section is capable of detecting whether each of plural types of halftone dot areas exists or not in the image data, and the automatic document type discrimination section estimates the type of the image data. Therefore, the image processing apparatus can exactly estimate the type of the image.

11 Claims, 20 Drawing Sheets

PAGE BACKGROUND

MAXIMUM DENSITY DIFFERENCE

PHOTOGRAPHIC PAPER

MAXIMUM DENSITY DIFFERENCE

HALFTONE DOT

MAXIMUM DENSITY DIFFERENCE

TEXT

MAXIMUM DENSITY DIFFERENCE

MAIN SCANNING DIRECTION

CURRENT PIXEL

SUB SCANNING DIRECTION

CURRENT PIXEL

|  | <1> | <2> | <3> | <4> | <5> | <6> | <7> | <8> |
|---|---|---|---|---|---|---|---|---|
| RISING/FALLING | ↑ | ↑ | — | — | — | ↓ | — | — |

↑ : RISING
↓ : FALLING
— : NEITHER RISING NOR FALLING

IMAGE PROCESSING METHOD AND APPARATUS, IMAGE READING APPARATUS, AND IMAGE FORMING APPARATUS DETECTING PLURAL TYPES OF IMAGES BASED ON DETECTING PLURAL TYPES OF HALFTONE DOT AREAS

This non-provisional application claims priority under 35 U.S.C. §119(a) on Patent Application No. 266987/2005 filed in Japan on Sep. 14, 2005 and Patent Application Ser. No. 182721/2006 filed in Japan on Jun. 30, 2006, the entire contents of which are hereby incorporated by reference.

FIELD OF THE INVENTION

The present invention relates to an image processing method, an image processing apparatus, an image reading apparatus, an image forming apparatus, a program, and a storage medium, each of which allows for judgment of the type of an image indicated by input image data.

BACKGROUND OF THE INVENTION

With the advance of digital image processing techniques, in the field of image forming apparatuses such as copying machines and printers adopting an electrophotography process or an ink-jet method, full-colored digital copying machines and digital multifunction printers which reproduce color images with high image quality are commercially available.

Examples of a document image copied by such image forming apparatuses include texts, lineal drawings, pictures, and combinations thereof. Therefore, in order to obtain a good reproduction image based on the document image, it is necessary to perform an image process in conformity to each document image.

In view of the circumstances, operational modes for selecting the type of a document, are available in an image forming apparatus, such as a text mode, a text/picture mode, and a picture mode.

However, it is very troublesome for a user to switch modes for each document. Further, if an inappropriate mode is selected, then extreme deterioration in images is often caused and therefore copies are wasteful.

As such, in order to solve the problem, there is proposed a technique for automatically judging the type of a document. Note that, a halftone printing as described below is a method used in prepress printing for example.

For example, Document 1 (Japanese Unexamined Patent Publication No. 126631/1998 (Tokukaihei 10-126631; published on May 15, 1998) discloses a technique for judging an ink-jet printing document outputted by an ink-jet printer, as well as judging the conventional type of a document such as a copied document, a silver halide print, or a halftone printing document. Namely, a characteristic regarding a color reproduction area and a characteristic regarding a texture are extracted from digital color signals obtained by reading out from the document, and then it is judged whether the document is an ink-jet printing document or not based on the characteristics.

To be specific, the ink-jet printing document has a characteristic of higher saturations of cyan and magenta than a general halftone printing document. Such a characteristic is extracted as the difference in the color reproduction area.

Further, an ink-jet printer uses an error diffusion method or a dither method to process image data. This causes the ink-jet printing original document to have a characteristic in which a texture made of dots exists on a white background of a paper. Therefore, although there is a small difference in the color reproduction areas between the ink-jet printing original document and an original document written with a fluorescent pen (namely, although the ink-jet printing document has little difference from the color reproduction areas of fluorescent blue and fluorescent purple components in terms of a signal value read by an input apparatus such as a color scanner, extraction of a characteristic regarding the texture allows the ink-jet printing original document to be discriminated from the document written with the fluorescent pen.

In Document 1, the ink-jet printing document is recognized and an appropriate process is performed with respect to the document thus recognized, thereby improving image quality. However, there are various ink-jet printing original documents printed with various resolutions, and there are various color materials, output papers, and halftones (error diffusion or dither). As such, it is difficult to recognize all ink-jet printing original documents by using conventional methods. Even if various ink-jet printing documents are recognized, it is difficult to reproduce all the ink-jet printing original documents in a good condition by the use of a single original document mode (single process).

For example, assume that an original document is prepared by outputting an image onto a paper exclusive to picture by the use of an ink-jet printer having an extremely high resolution (approximately 2800 dpi (dot per inch)). If the ink-jet printing original document thus prepared is read by an input apparatus having a normal resolution (approximately 600 dpi), then it is impossible for the input apparatus to read each dot. This will cause the result of reading which is the same as that of a photographic-picture. Under the circumstances, a better reproduction image can be obtained by processing the ink-jet printing document in the same way as a photographic-picture original document, rather than by processing the ink-jet printing original document in a way exclusive to the ink-jet printing original document.

Further, in a case of an ink-jet printing original document prepared by outputting an image onto an ordinary paper or a recycled paper by the use of an ink-jet printer having a low resolution (600 dpi or less), it is possible to read almost all dots. Further, such an ink-jet printing original document thus prepared has an equivalent range of color reproduction (color gamut) to a halftone printing original document. As a result, it is difficult to discriminate the ink-jet printing original document from the halftone printing original document. Namely, the ink-jet printing original document has substantially the same characteristic to be recognized as that of the halftone printing document. Under the circumstances, a better reproduction image can be obtained by processing the ink-jet printing document in the same way as a text printing picture document or a printing picture document (halftone printing picture).

Further, in a case of an ink-jet printing original document such as texts or graphs, a better reproduction image can be obtained by processing the ink-jet printing original document in the same way as a text original document.

On the other hand, an ink-jet printing original document becomes similar to a photographic-picture original document as the number of dots is increased, and the ink-jet printing original document becomes similar to a halftone printing original document as the number of dots drops. Note however that there is an ink-jet printing original document having an intermediate nature between the picture original document on a photographic printing paper and the halftone printing original document. Examples of the ink-jet printing document having the intermediate nature include (i) an original document which is prepared by an ink-jet image forming apparatus having a resolution between a low resolution and a middle resolution, which apparatus forms an image with high density ink so that high density areas and low density areas are mixed with each other, and (ii) an original document which is prepared by the image forming apparatus which forms an image with a low density ink so that low density areas are entirely formed.

When either a process suitable for a halftone printing original document or a process suitable for a photographic-picture document is performed with respect to the ink-jet printing original document having the intermediate nature, a deterioration in image quality such as tone distortion is caused. Note that, this kind of problem occurs not only in the ink-jet printing original document but also in other documents such as an original document outputted from based on the electrophotography method.

In view of the circumstances, a technique for exactly estimating the type of an original document image (input image) is demanded. This is because it is necessary to carry out a process suitable for the type of image so that an image with high quality can be obtained, when processing an original document image read by a scanner.

SUMMARY OF THE INVENTION

Therefore, an object of the present invention is to provide an image processing method, an image processing apparatus, an image reading apparatus, an image forming apparatus, a program, and a storage medium, each of which allows for exact estimation of the type of an image.

In order to solve the problem, the image processing apparatus according to the present invention is an image processing apparatus, including a discrimination section for estimating the type of input image data, wherein the discrimination section is capable of detecting whether each of plural types of halftone dot areas exists or not in the image data, and the discrimination section estimates the type of the image data on the basis of a result of the detection.

Further, the method according to the present invention is a method for processing an image, including the step of judging the type of input image data, wherein: in the step, it is detected whether each of plural types of halftone dot areas exists or not in the image data, and the type of the image data is judged on the basis of a result of the detection.

With the arrangement, on the basis of whether each of the plural types of halftone dot areas exists or not in the image data, it is possible to classify the type of image data including a halftone dot area into plural types. As a result, it is possible to detect, as a halftone dot area, not only a halftone printing area in prepress printing but also a halftone dot area in an image outputted by an ink-jet printer or an image forming apparatus adopting the electrophotography method, so that it is possible to exactly detect the type of the image data (document from which the image data is read).

The image processing apparatus according to the present invention is an image processing apparatus, including a discrimination section for estimating the type of input image data, wherein the discrimination section is capable of detecting whether each of plural types of halftone dot areas exists or not in the image data, by using a threshold value, regarding same characteristics, which is set with respect to each of the plural types of halftone dot areas, and the discrimination section estimates the type of the image data on the basis of a result of the detection.

Further, the method according to the present invention is a method for processing an image, including the step of judging the type of input image data, wherein: in the step, it is detected whether plural types of halftone dot areas exist or not in the image data on the basis of a threshold value, regarding same characteristics, which is set with respect to each of the plural types of halftone dot areas, and the type of the image data is judged on the basis of a result of the detection.

With the arrangement, on the basis of whether each of the plural types of halftone dot areas exists or not in the image data, it is possible to classify the type of image data including a halftone dot area into plural types. As a result, it is possible to detect, as a halftone dot area, not only a halftone printing area but also a halftone dot area in an image outputted by an ink-jet printer or an image forming apparatus adopting the electrophotography method, so that it is possible to exactly detect the type of the image data (document from which the image data is read).

Further, when a halftone dot area is detected from the image data, a threshold value, regarding same characteristics, which is set with respect to each of the plural types of halftone dot areas is used, so that it is easy to set the threshold value and to compare the characteristic with the threshold value.

The image processing apparatus according to the present invention is an image processing apparatus, including a discrimination section for estimating the type of input image data, wherein the discrimination section is capable of detecting whether each of plural types of halftone dot areas exists or not in the image data, by using threshold values which are set with respect to the plural types of halftone dot areas respectively and which differ from each other so as to correspond to at least two types of halftone dot areas respectively, and the discrimination section estimates the type of the image data on the basis of a result of the detection.

Further, the method according to the present invention is a method for processing an image, including the step of judging the type of input image data, wherein: in the step, it is detected whether each of plural types of halftone dot areas exists or not in the image data on the basis of threshold values which are set with respect to the plural types of halftone dot areas respectively and which differ from each other so as to correspond to at least two types of halftone dot areas respectively, and the type of the image data is judged on the basis of a result of the detection.

With the arrangement, on the basis of whether each of the plural types of halftone dot areas exists or not in the image data, it is possible to classify the type of image data including a halftone dot area into plural types. As a result, it is possible to detect, as a halftone dot area, not only a halftone printing area but also a halftone dot area in an image outputted by an ink-jet printer or an image forming apparatus adopting the electrophotography method, so that it is possible to exactly detect the type of the image data (document from which the image data is read).

Further, when a halftone dot area is detected from the image data, there are used the threshold values judgment methods) which are set with respect to plural types of halftone dot areas respectively and which differ from each other so as to correspond to at least two types of halftone dot areas respectively. As a result, it is possible to detect a halftone dot area from different points of view (threshold values), or it is possible to detect a halftone dot area by using a method or a characteristic most appropriate to the halftone dot area. As a result, it is possible to judge the type of image data more exactly.

The image processing apparatus according to the present invention is an image processing apparatus, including a discrimination section for estimating the type of input image data, wherein the discrimination section includes: a halftone dot pixel detection section for extracting, from the image data, a first characteristic regarding halftone dot pixels including first halftone dot pixels and second halftone dot pixels, and for detecting the halftone dot pixels from the image data on the basis of the first characteristic; a first halftone dot pixel detection section for extracting a second characteristic, regarding the halftone dot pixels, which is different from the first characteristic, and for detecting the first halftone dot pixels from the halftone dot pixels on the basis of the second characteristic; and a type determination section for calculating the number of the second halftone dot pixels from the number of the halftone dot pixels and the number of the first halftone dot pixels, and for determining the type of the image data on the basis of the number of the first halftone dot pixels and the number of the second halftone dot pixels.

Further, the method according to the present invention is a method for processing an image, including the step of judging the type of input image data, wherein said step includes the sub-steps of: extracting, from the image data, a first characteristic regarding halftone dot pixels including first halftone dot pixels and second halftone dot pixels, and detecting the halftone dot pixels from the image data on the basis of the first characteristic; extracting a second characteristic, regarding the halftone dot pixels, which is different from the first characteristic, and detecting the first halftone dot pixels from the halftone dot pixels on the basis of the second characteristic; and calculating the number of the second halftone dot pixels from the number of the halftone dot pixels and the number of the first halftone dot pixels, and determining the type of the image data on the basis of the number of the first halftone dot pixels and the number of the second halftone dot pixels.

With the arrangement, a halftone dot pixel detection section extracts, from the image data, the first characteristic regarding halftone dot pixels including first halftone dot pixels and second halftone dot pixels, and detects the halftone dot pixels from the image data on the basis of the first characteristic. The first halftone dot pixel detection section extracts the second characteristic, regarding the halftone dot pixels, which is different from the first characteristic, and detects the first halftone dot pixels from the halftone dot pixels on the basis of the second characteristic. The type determination section calculates the number of the second halftone dot pixels from the number of the halftone dot pixels and the number of the first halftone dot pixels, and determines the type of the image data on the basis of the number of the first halftone dot pixels and the number of the second halftone dot pixels.

In this way, with the arrangement, on the basis of whether each of the plural types of halftone dot areas exists or not in the image data, it is possible to classify the type of image data including a halftone dot area into plural types. As a result, it is possible to detect, as a halftone dot area, not only a halftone printing area but also a halftone dot area in an image outputted by an ink-jet printer or an image forming apparatus adopting the electrophotography method, so that it is possible to exactly detect the type of the image data (document from which the image data is read).

For a fuller understanding of the nature and advantages of the invention, reference should be made to the ensuing detailed description taken in conjunction with the accompanying drawings.

BRIEF DESCRIPTION OF THE DRAWINGS

FIG. 3(*b*) is an explanatory drawing illustrating the maximum density difference and distribution of areas having density in a photographic paper area. FIG. 3(*c*) is an explanatory drawing illustrating the maximum density difference and distribution of areas having density in a halftone dot area. FIG. 3(*d*) is an explanatory drawing illustrating the maximum density difference and distribution of areas having density in a text area.

FIG. 5(*b*) is an explanatory drawing illustrating changes in density in the area including the first halftone dot pixel.

FIG. 6(*b*) is an explanatory drawing illustrating changes in density in the area including the second halftone dot pixel.

DESCRIPTION OF THE EMBODIMENTS

Embodiment 1

The following explains an embodiment of the present invention. Note that, the embodiment explains a case where an image processing apparatus according to the present invention is applied to a digital color copying machine.

Further, in the following, examples of a pixel belonging to a halftone dot area include not only a pixel of an image made of halftone dots but also a pixel of an image in which a halftone reproduction is carried out based on binary or multivalent area change, such as: a pixel of line screen halftone image made of parallel lines which are provided regularly and densely; a pixel of an image prepared based on the error diffusion method; a pixel of an image prepared based on the pixel distribution method; a pixel of an image prepared based on the dither method; or a pixel of an image prepared based on the density pattern method.

Further, in the present embodiment, the image processing apparatus can discriminate a document having an intermediate nature between a halftone printing document and a photographic-picture original document. Examples of the document having the intermediate nature include (i) a document, with high density areas and low density areas, which is obtained as in the case where an ink-jet image forming apparatus, having a resolution within a range of a low resolution to middle resolution, forms an image by using high density ink, and (ii) a document, with entire low density, which is obtained as in the case where the image forming apparatus forms an image by using low density ink. Similar original documents to such kind of documents are documents outputted by an electrophotographic image forming apparatus. These documents are hereinafter referred to as "specific ink-jet and the like output original documents".

Figure 2:
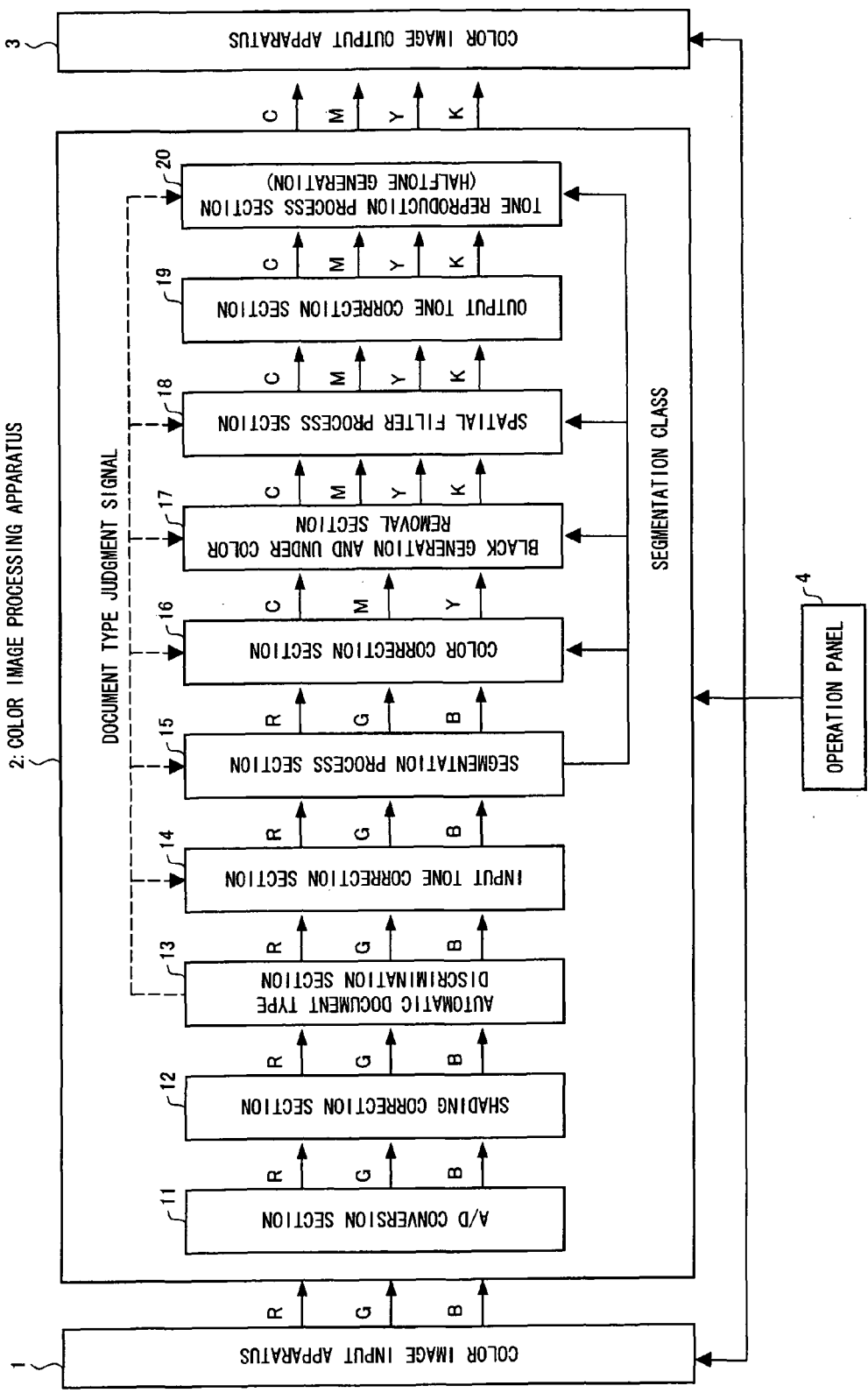
FIG. 2 is a block diagram schematically illustrating a structure of a digital color copying machine including the automatic document type discrimination section illustrated in FIG. 1.
Figure 3:
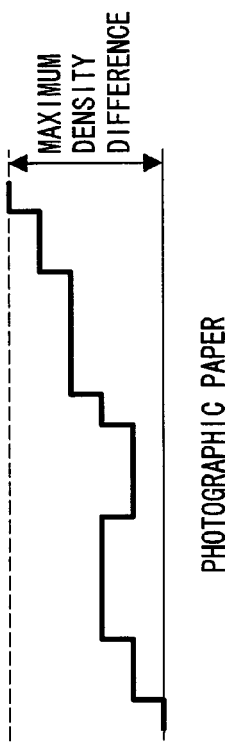
FIG. 3(*a*) is an explanatory drawing illustrating the maximum density difference and distribution of areas having density in a page background area.
Figure 3:
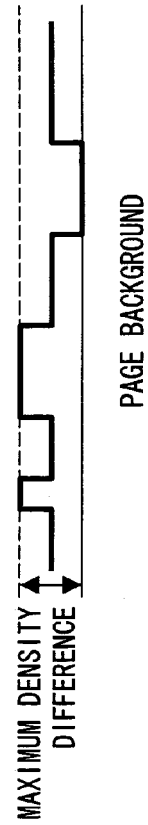
Figure 3:
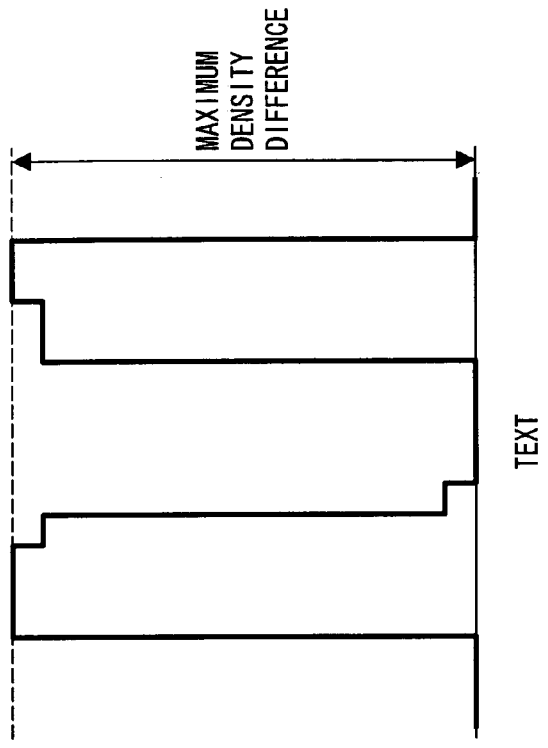
Figure 3:
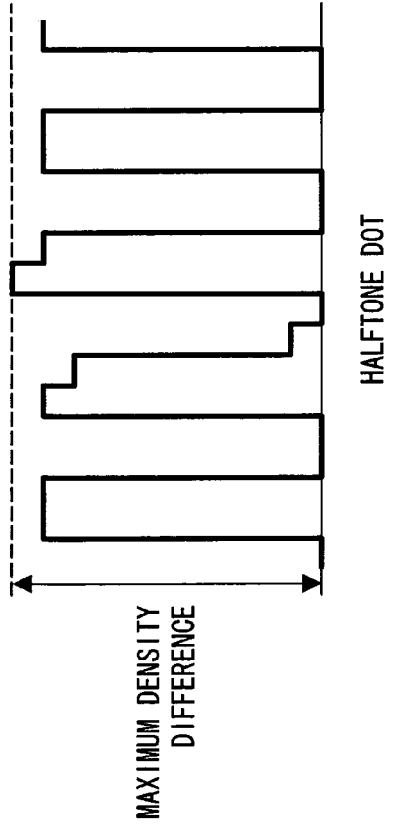

FIG. 2 is a block diagram schematically illustrating the structure of a digital color copying machine to which a color image processing apparatus according to the present invention is applied.

As illustrated in FIG. 2, the digital color copying machine according to the present invention includes a color image input 1, a color image processing 2, a color image output 3, and an operation panel 4. The color image processing 2 includes an A/D conversion section 11, a shading correction section 12, an automatic document type discrimination section (discrimination means) 13, an input tone correction section 14, a segmentation process section 15, a color correction section 16, a black generation and under color removal section 17, a spatial filter process section 18, an output gradation correcting section 19, and a tone reproduction process section 20.

The color image input apparatus (image reading means) 1 includes a scanner section (not shown) including a CCD (Charge Coupled Device) for example. The color image input 1 reads a reflective light image from an original document as analog RGB signals (red, green, and blue) by use of the CCD, and outputs the analog RGB signals to the color image processing 2.

The analog signals read out by the color image input apparatus 1 are supplied to the color image processing apparatus 2, where the analog signals are transmitted to the A/D conversion section 11, the shading correction section 12, the automatic document type discrimination section 13, the input tone correction section 14, the segmentation process section 15, the color correction section 16, the black generation and under color removal section 17, the spatial filter process section 18, the output tone correction section 19, and the tone reproduction process section 20 in this order, and are outputted to the color image output apparatus 3 as digital color CMYK signals.

The A/D (analog/digital) conversion section 11 converts analog RGB signals into digital RGB signals. The shading correction section 12 performs a process for removing various distortions generated in an illumination system, an image focusing system, and an image sensing system of the color image input apparatus 1 from the digital RGB signals transmitted from the A/D conversion section 11. Further, the shading correction section 12 performs a process for adjusting color balance.

The automatic document type discrimination section 13 converts the digital RGB signals (RGB reflectance signals), from which the distortions have been removed by the shading correction section 12 and to which color balance has been adjusted by the shading correction section 12, into signals such as density signals, which are easily dealt with by an image processing system adopted by the color image processing apparatus 2. Further, the automatic document type discrimination section 13 estimates the type of a document. A document type discrimination signal generated by the automatic document type discrimination section 13 is outputted to the input tone correction section 14, the color correction section 16, the black generation and under color removal section 17, the spatial filter process section 18, and the tone reproduction process section 20. Note that, the automatic document type discrimination section 13 is detailed later.

The input tone correction section 14 performs an image quality adjustment process such as removal of page background density and/or adjustment of contrast.

The segmentation process section 15 separates, on the basis of the RGB signals, each pixel in an input image into a text area, a halftone dot area, and a picture (photographic-picture) area. In accordance with results thus separated, the segmentation process section 15 outputs a segmentation class signal, indicating which area a pixel belongs to, to the color correction section 16, the black generation and under color removal section 17, the spatial filter process section 18, and the tone reproduction process section 20, while the segmentation process section 15 outputs an input signal, as it is, supplied from the input tone correction section 14 to the color correction section 16 in a subsequent stage.

The color correction section 16 performs a process for removing, from the digital RGB signals, color impurity which varies depending on spectral characteristics of CMY (cyan, magenta, and yellow) color materials including useless absorption components, thereby realizing a faithful color reproduction.

The black generation and under color removal section 17 performs a black generation process for generating a black (K) signal based on three-colored CMY signals which have been subjected to the color correction process, and performs a process for removing, from the original CMY signals, the K signal obtained in black generation so as to generate new CMY signals. Three-colored CMY signals are converted into four-colored CMYK signals.

An example of the black generation process is a method (general method) for generating black based on the skeleton black. According to the method, the black generation and under color removal process is represented by equation (1) as indicated below. In the equation (1), y=f(x) indicates an input/output characteristic of a skeleton curve, C, M, and Y indicate input data items, C', M', Y', and K' indicate output data items, and $\alpha(0<\alpha<)$ indicate UCR (Under Color Removal) ratio.

$$K'=f\{min\ (C, M, Y)\}$$

$$C'=C-\alpha K'$$

$$M'=M-\alpha K'$$

$$Y'=Y-\alpha K' \quad (1)$$

Based on the segmentation class signal, the spatial filter process section 18 performs, by use of a digital filter, a spatial filtering process with respect to image data indicated by the CMYK signals supplied from the black generation and under color removal section 17. This allows corrections of spatial frequency characteristics, thereby preventing blurs and/or deterioration in graininess of an output image. Based on the segmentation class signal, the tone reproduction process section 20 performs a predetermined process with respect to image data indicated by the CMYK signals, just like the spatial filter process section 18.

For example, with respect to an area which has been classified into a text area by the segmentation process section 15, a sharpness enhancing process in a spatial filtering process is carried out by the spatial filtering section 18 so that high frequency components are more enhanced. This allows an enhancement in reproducibility of achromatic texts (black texts) or chromatic texts (color texts). At the same time, the tone reproduction process section 20 selects between a binary process and a multi-level dithering process in a high-resolution screen suitable for reproducing high frequency components.

Further, with respect to an area which has been classified into a halftone dot area by the segmentation section 15, the spatial filter process section 18 performs a low-path filtering so as to remove input halftone dot components. Then, the output tone correction section 19 performs an output tone correction process for converting a signal such as a density signal into tone values which are characteristics of the color image output 3. Thereafter, the tone reproduction process section 20 performs the tone reproduction (halftone generation) for ultimately separating an image into pixels so as to reproduce a tone of each of the pixels. With respect to an area which has been classified into a picture area by the segmentation process section 15, a binary process or a multi-level dithering process is performed in a screen which puts a high value on tone reproducibility.

The operation panel 4 includes: a display section (not shown) such as a liquid crystal display; and setting buttons. Operations of the color image input apparatus 1, the color image processing apparatus 2, and the color image output 3, respectively, are controlled in response to information entered via the operation panel 4.

Image data which has been subjected to the foregoing processes is temporarily stored in storage means and is read out from the storage means at a predetermined timing so as to be supplied to the color image output apparatus 3. The color image output apparatus 3 outputs image data onto a recording medium such as paper. An example of the color image output apparatus 3 is a color image output apparatus adopting an electrophotography method or an ink-jet method, but the color image output apparatus 3 is not particularly limited to this. Note that, the above processes are controlled by a CPU (Central Processing Unit) (not shown).

Figure 1:
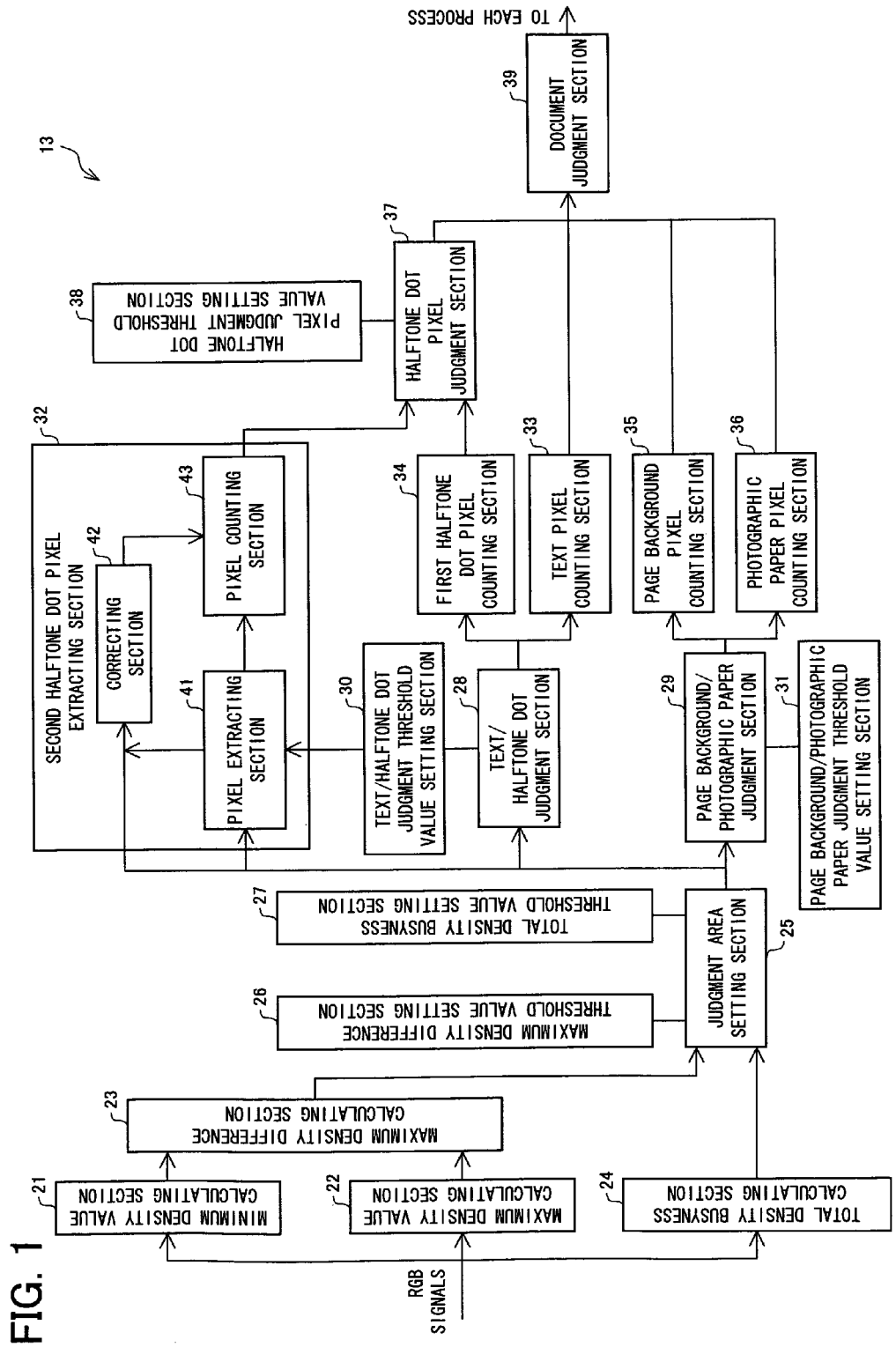
FIG. 1 is a block diagram illustrating a structure of an automatic document type discrimination section included in an image processing apparatus according to an embodiment of the present invention.

FIG. 1 is a block diagram illustrating a structure of the automatic document type discrimination section 13 illustrated in FIG. 2. As illustrated in FIG. 1, the automatic document type discrimination section 13 includes: a minimum density value calculating section 21 (characteristic extracting section); a maximum density value calculating section 22 (characteristic extracting section); a maximum density difference calculating section 23 (characteristic extracting section); a total density busyness calculating section 24 (characteristic extracting section); a judgment area setting section (first halftone dot pixel detecting section, second halftone dot pixel detecting section) 25; a maximum density difference threshold value setting section (threshold value setting section) 26; a total density busyness threshold value setting section (threshold value setting section) 27; a text/halftone dot judgment section (first halftone dot pixel detecting section) 28; a page background/photographic paper judgment section 29; a text/halftone dot threshold value setting section (threshold value setting section) 30; a page background/photographic paper judgment threshold value setting section 31; a second halftone dot pixel extracting section 32; a text pixel counting section 33; a first halftone dot pixel counting section 34; a page background pixel counting section 35; a photographic paper pixel counting section 36; a halftone dot pixel judgment section (type determining section) 37; a halftone dot pixel judgment threshold value setting section (type determining section) 38; and a document judging section (type determining section) 39.

The minimum density value calculating section 21 calculates minimum density values of a block which includes a plurality of pixels and which includes a single current pixel. The maximum density value calculating section 22 calculates maximum density values of the block. The maximum density difference calculating section 23 calculates a maximum density difference of the block by using the minimum density values calculated by the minimum density value calculating section 21 and the maximum density values calculated by the maximum density value calculating section 22.

The total density busyness calculating section 24 calculates a total of absolute values of density differences between adjacent pixels in the block. To be specific, the total density busyness calculating section 24 calculates, in the block, the sum of (i) a total of absolute values of density differences between adjacent pixels in a main scanning direction (in a line direction of the case where an image is read out by dividing the image into a plurality of lines) and (ii) a total of absolute values of density differences between adjacent pixels in a sub scanning direction (in a direction perpendicular to the line direction). Note that, in addition to the above calculations, the total density busyness calculating section 24 may calculate, in the block, the sum of (i) a total of absolute values of density differences between adjacent pixels in a 45-degree direction and (ii) a total of absolute values of density differences between adjacent pixels in a 135-degree direction.

The judgment area setting section 25 compares the maximum density difference calculated by the maximum density difference calculating section 23 with a first maximum density difference threshold value THd1 given from the maximum density difference threshold value setting section 26, and the judgment area setting section 25 compares the total density busyness calculated by the total density busyness calculating section 24 with a first total density busyness threshold value THb1 given from the total density busyness threshold value setting section 27. This allows the judgment area setting section 25 to judge whether the current pixel in the block belongs to a page background area/photographic paper (photographic-picture) area or a text area/halftone dot area.

Further, the judgment area setting section 25 compares the maximum density difference calculated by the maximum density difference calculating section 23 with a second maximum density difference threshold value THd2 (THd1>THd2) given from the maximum density difference threshold value setting section 26, and the judgment area setting section 25 compares the total density busyness calculated by the total density busyness calculating section 24 with a second total density busyness threshold value THb2 (THb1>THb2) given from the total density busyness threshold value setting section 27. This allows the judgment area setting section 25 to judge whether or not the block satisfies a condition in which the maximum density difference is not less than the second maximum density difference threshold value THd2 and the total density busyness is not less than the second total density busyness threshold value THb2.

The judgment process using the first maximum density difference threshold value THd1 and the first total density busyness threshold value THb1 and the judgment process using the second maximum density difference threshold value THd2 the second total density busyness threshold value THb2 are sequentially performed with respect to a current pixel. Namely, the automatic document type discrimination section 13 performs a judgment process for judging which area a current pixel belongs to, by use of two types of threshold values, i.e., the maximum density difference threshold value and the total density busyness threshold value. Further, as a sequential shift is carried out from one current pixel to the next current pixel, a sequential shift is carried out from an area of a block including the current pixel to an area of a block including the next current pixel. Note that various controls for the judgment processes are performed by a CPU.

On the basis of the maximum density difference calculated by the maximum density difference calculating section 23, the maximum density difference threshold value setting section 26 sets (i) the first maximum density difference threshold value THd1 used to judge whether a current pixel belongs to a page background area/photographic paper (photographic-picture) area or a text area/halftone dot area and (ii) the second maximum density difference threshold value THd2 (THd1>THd2) used to judge whether the current pixel is a second halftone dot pixel or not. The first maximum density difference threshold value THd1 and the second maximum density difference threshold value THd2 are used in the judgment area setting section 25.

On the basis of the total density busyness calculated by the total density busyness calculating section 24, the total density busyness threshold value setting section 27 sets (i) the first total density busyness threshold value THb1 used to judge whether the current pixel belongs to the page background area/photographic paper area or the text area/halftone dot area and (ii) the second total density busyness threshold value THb2 (THb1>THb2) used to judge whether the current pixel is the second halftone dot pixel or not. The first total density busyness threshold value THb1 and the second total density busyness threshold value THb2 are used in the judgment area setting section 25.

Note that, the second maximum density difference threshold value THd2 and the second total density busyness threshold value THb2 are set, while drawing upon threshold values for detecting pixels belonging to a photographic picture area for example, so that pixels judged to have characteristics of a halftone dot area can be extracted, namely, so that wide range of pixels of a halftone dot area, including not only halftone dots used in a halftone printing (first halftone dot pixels) but also pixels whose tone reproduction is performed by use of a method such as error diffusion, dither process, or line screen halftone (second halftone dot pixels), can be extracted.

With respect to a pixel judged by the judgment area setting section 25 to belong to the text/halftone dot area, the text/halftone dot judgment section 28 judges whether such a pixel belongs to the text area or the halftone dot area (first halftone dot pixel). The text/halftone dot judgment threshold value setting section 30 sets a text/halftone dot judgment threshold value which the text/halftone dot judgment section 28 uses in order to perform the judgment.

With respect to a pixel judged by the judgment area setting section 25 to belong to the page background area/photographic paper area, the page background/photographic paper judgment section 29 judges whether the pixel belongs to a page background area or a photographic paper area (photographic-picture area, continuous tone area). The page background/photographic paper judgment threshold value setting section 31 sets a page background/photographic paper judgment threshold value which the page background/photographic paper judgment section 29 uses in order to perform the judgment.

The second halftone dot pixel extracting section 32 includes a pixel extracting section (second halftone dot pixel detecting section) 41, a correcting section 42, and a pixel counting section 43.

With respect to a current pixel in a block judged by the judgment area setting section 25 that the maximum density difference is not less than the second maximum density difference threshold value THd2 and the total density busyness is not less than the second total density busyness threshold value THb2, the pixel extracting section 41 compares a multiplication of the maximum density difference and the text/halftone dot judgment threshold value with the total density busyness, and the pixel extracting section 41 extracts, as the second halftone dot pixel, a current pixel in a block satisfying a condition in which the total density busyness is not less than the multiplication of the maximum density difference and the text/halftone dot judgment threshold value.

With respect to pixels judged by the judgment area setting section 25 to be pixels which belong to neither the text area nor the halftone dot area on the basis of the second maximum density difference threshold value THd2 and the second total density busyness threshold value THb2, or with respect to pixels (current pixels) which have not been extracted by the pixel extracting section-41 as the second halftone dot pixels, the correction section 42 performs correction so that pixels capable of being regarded as the second halftone dot pixels are dealt with as the second halftone dot pixels. Whether the correction section 42 performs correction or not is determined on the basis of the result of judgment performed with respect to pixels around the current pixel.

The pixel count section 43 counts the number of pixels which are judged (including the number of assumed pixels), by the pixel extracting section 41 and the correction section 42, to be the second halftone dot pixel.

The text pixel count section 33 counts the number of pixels judged by the text/halftone dot judgment section 28 to belong to the text area. The first halftone dot pixel counting section 34 counts the number of pixels judged by the text/halftone dot judgment section 28 to belong to the halftone dot area (the first halftone dot pixel). The page background pixel count section 35 counts the number of pixels judged by the page background/photographic paper judgment section 29 to belong to the page background area. The photographic paper pixel counting section 36 counts the number of pixels judged by the page background/photographic paper judgment section 29 to belong to the photographic-picture area. Note that, the counted numbers are obtained from whole areas of the document image.

The halftone dot pixel judgment section 37 compares (i) the result of counting carried out by the first halftone dot pixel count section 34 with respect to pixels belonging to the halftone dot area (first halftone dot pixels) and (ii) the result of counting carried out by the pixel count section 43 of the second halftone dot pixel extracting section 32 with respect to the second halftone dot pixels with the halftone dot pixel judgment threshold value given by the halftone dot pixel judgment threshold value setting section 38, thereby judging whether halftone dots (first halftone dot pixel) are included in the document image or not. The halftone dot pixel judgment threshold value setting section 38 sets the halftone dot pixel judgment threshold value used by the halftone dot pixel judgment section 37.

The document judgment section 39 judges the type of a document on the basis of the results of counting carried out by the text pixel counting section 33, the page background pixel counting section 35, and the photographic paper pixel counting section 36 with respect to each type of pixels, and on the basis of the result of judgment carried out by the halftone dot pixel counting section 37.

Here, with reference to FIGS. 3(a) to 3(d), the following explains examples of distributions of pixel density in the text area, the halftone dot area, the photographic-picture area, and a page background area. Further, with reference to FIG. 4, the following explains distributions of each area so that the maximum density difference and the total density busyness are used as indices. Note that, in the relation between the total density busyness and the maximum density difference, the total density busyness does not become equal to or less than the maximum density difference, and accordingly the area under the line defined by the maximum density difference=the total density busyness in FIG. 4 indicates that there is no pixel.

Figure 4:
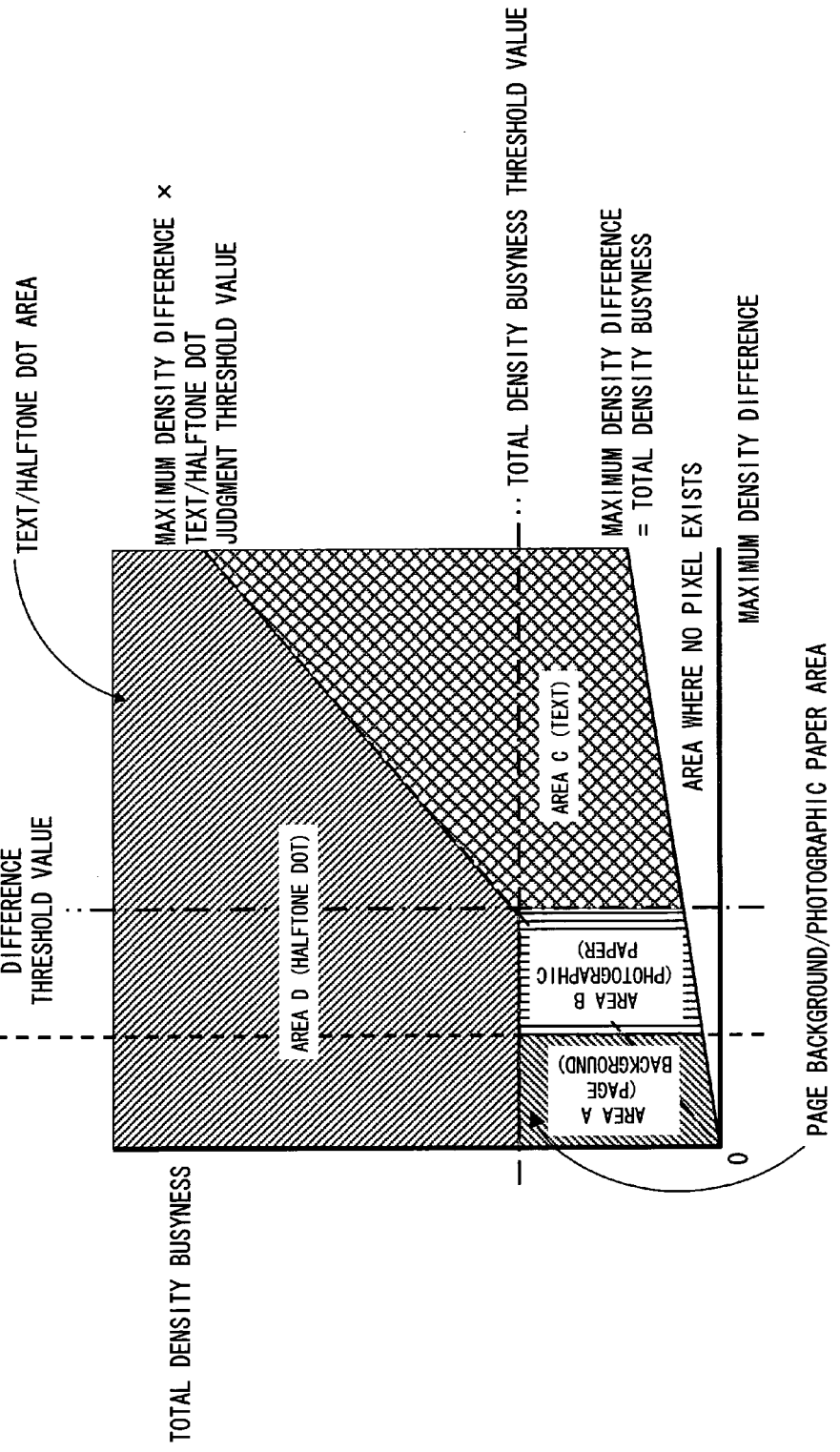
FIG. 4 is a graph illustrating a relation between the maximum density difference and total density busyness of each area illustrated in FIG. 3.

As illustrated in FIG. 3(a), the page background area has little change in density and accordingly the maximum density difference and the total density busyness become extremely small, so that the page background area is located in an area A in FIG. 4. As a result, a pixel which is judged to belong to the page background/photographic printing paper area and which exists in a block whose maximum density difference is smaller than the page background/photographic paper judgment threshold value can be judged to be a page background pixel.

As illustrated in FIG. 3(b), the photographic-picture area generally has smooth change in density, and the maximum density difference and the total density busyness are small and a bit larger than those of the page background area, so that the photographic-picture area is located in an area B in FIG. 4. As a result, a pixel (current pixel) which is judged to belong to the page background area/photographic printing paper area and which exists in a block whose maximum density difference is larger than the page background/photographic paper judgment threshold value can be judged to belong to the photographic printing paper area.

As illustrated in FIG. 3(c), although the halftone dot area has various maximum density differences according to halftone dots, the halftone dot area has changes in density as many as halftone dots, so that the ratio of the total density busyness to the maximum density difference becomes large. As a result, the halftone dot area is located in an area D in FIG. 4. Therefore, a pixel (current pixel) which is judged to belong to the text/halftone dot area and which exists in a block whose total density busyness is larger than a multiplication of the maximum density difference and the text/halftone dot judgment threshold value can be judged to belong to the halftone dot area.

As illustrated in FIG. 3(d), in the text area, although the maximum density difference is large and accordingly the total density busyness is large, change in density is smaller than that in the halftone dot area and accordingly the total density busyness is smaller than that in the halftone dot area. Particularly, the ratio of the total density busyness to the maximum density difference is small, so that the text area is distributed in an area C in FIG. 4. Therefore, a pixel (current pixel) which is judged to belong to the text/halftone dot area and which exists in a block whose total density busyness is smaller than a multiplication of the maximum density difference and the text/halftone dot judgment threshold value can be judged to belong to the text area.

As described above, the page background area and the photographic-picture area have smaller maximum density difference and smaller total density busyness than the text area and the halftone dot area. Therefore, by comparing the maximum density difference with the maximum density difference threshold value (first maximum density difference threshold value THd1) and comparing the total density busyness with the total density busyness threshold value (first total density busyness threshold value THb1), the judgment area setting section 25 can judge whether the current pixel belongs to the page background/photographic paper area or the text/halftone dot area.

Figure 5:
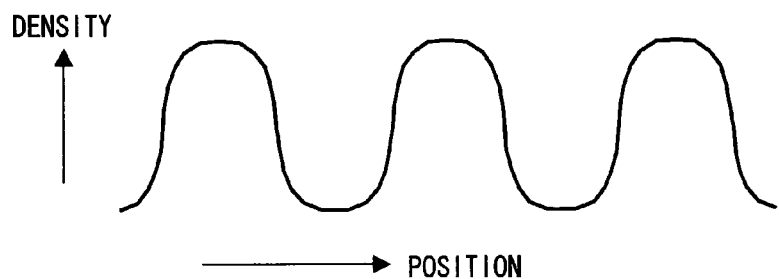
FIG. 5(*a*) is an explanatory drawing illustrating density values of pixels near a halftone dot (1 dot) in an area including a first halftone dot pixel (halftone dot).
Figure 5:
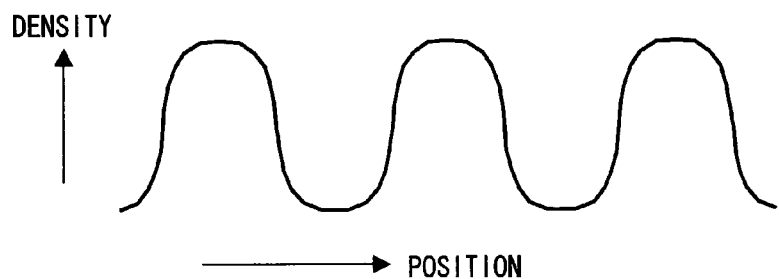
Figure 6:
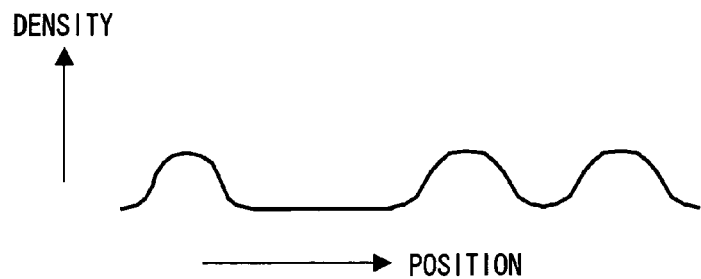
FIG. 6(*a*) is an explanatory drawing illustrating density values of pixels near 1 dot in an area including a second halftone dot pixel.
Figure 6:
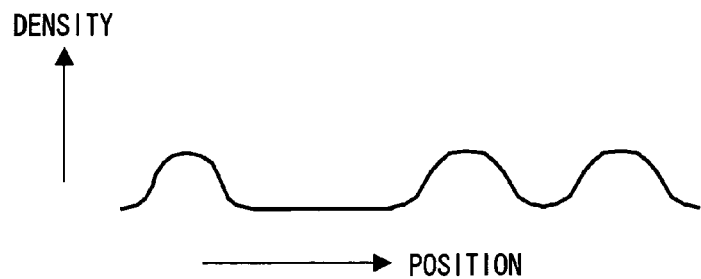
Figure 7:
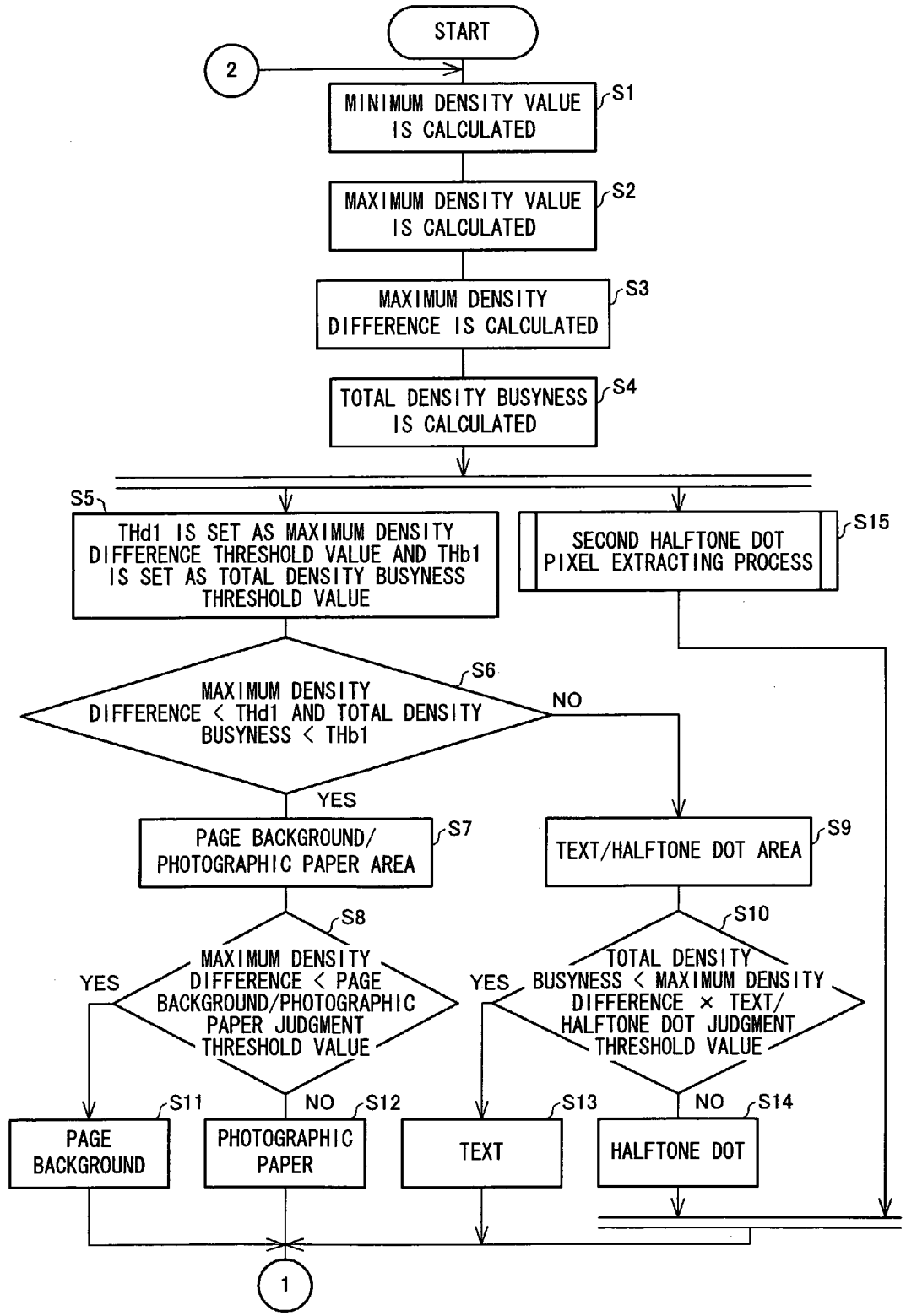
FIG. 7 is a flowchart illustrating a flow of a document type discrimination process carried out by the automatic document type discrimination section illustrated in FIG. 1.
Figure 8:
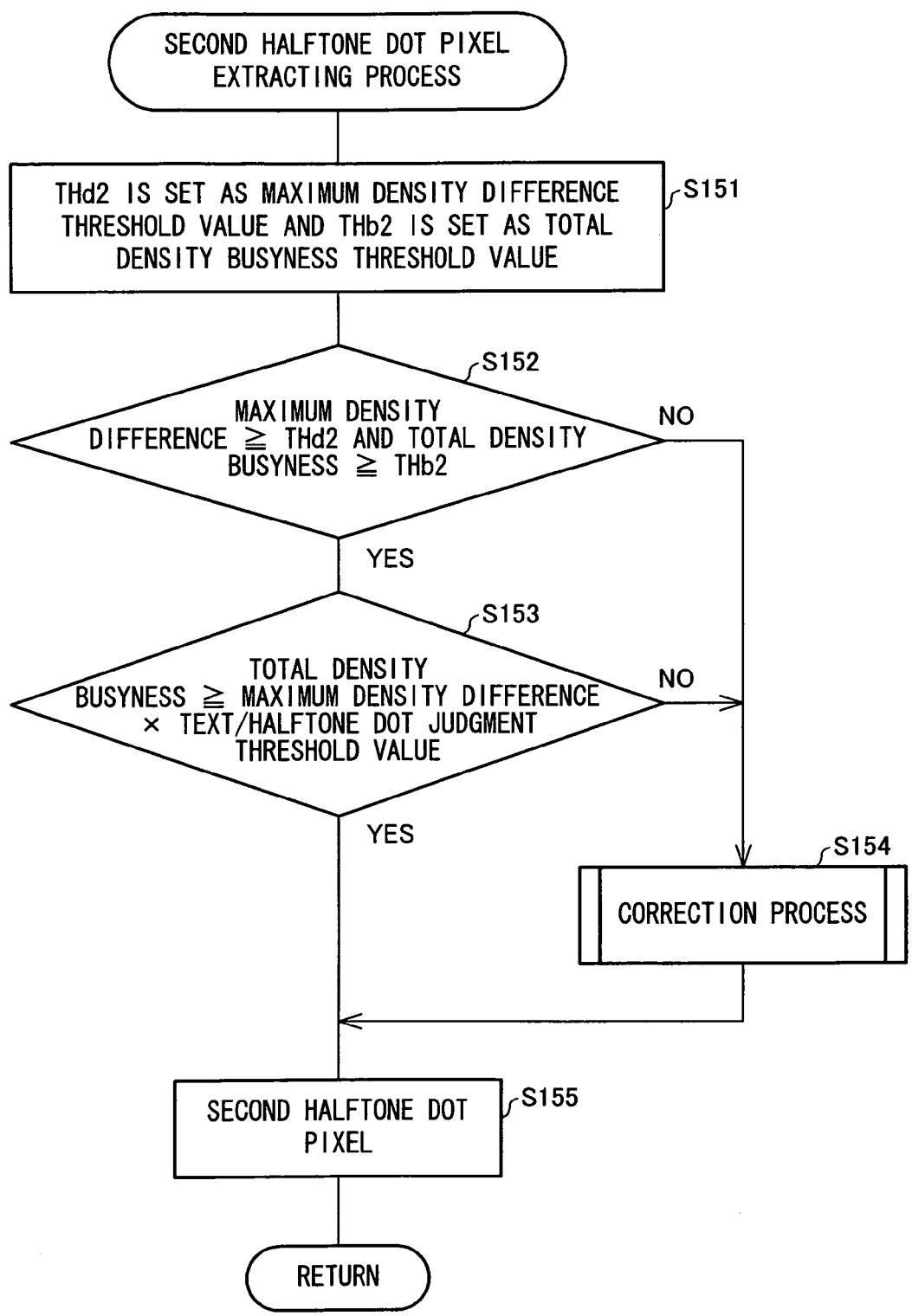
FIG. 8 is a flowchart illustrating a flow of a second halftone dot pixel extracting process carried out by a second halftone dot pixel extracting section illustrated in S15 of FIG. 7.
Figure 9:
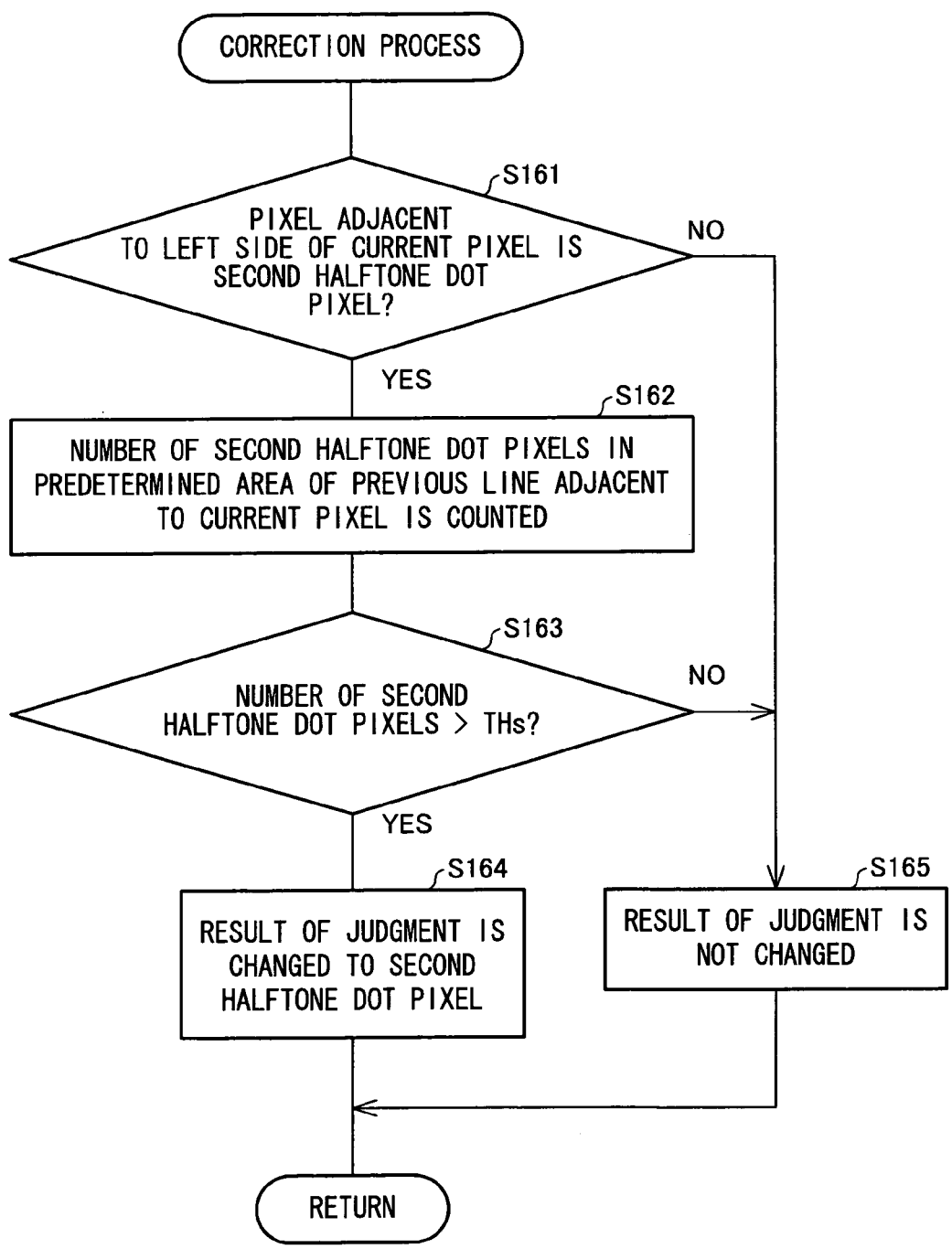
FIG. 9 is a flowchart illustrating a flow of a correction process carried out by a correction section illustrated in S154 of FIG. 8.

Next, the following explains the first halftone dot pixel and the second halftone dot pixel. FIG. 5(a) explains density values of pixels (pixel values) around a halftone dot (1 dot) in an area including the first halftone dot pixel. FIG. 5(b) explains changes in density in the area including the first halftone dot pixel. In the same way, FIG. 6(a) explains density values of pixels around 1 dot in an area including the second halftone dot pixel. FIG. 6(b) explains changes in density in the area including the second halftone dot pixel. Note that, in FIGS. 5(a) and 6(a), densities of dots are represented by six values. "0" indicates the minimum density (white: a page background) and "5" indicates the maximum density.

Halftone dots (first halftone dot pixel) used in the halftone printing have sharp contrast and halftone frequencies suitable for a printing document are used. Therefore, in a halftone printing document, densities of halftone dots are high and each interval between two halftone dots is substantially constant (see FIGS. 5(a) and 5(b)).

On the other hand, in an image outputted by an ink-jet image forming apparatus (a printer, a copying machine, and a multifunction printer), error diffusion or blue-noise mask is frequently used as a halftoning process, so that each interval between two dots is not constant. Further, because light shade ink or a similar component is used, contrast between dots is not so clear as that of the halftone printing document. Further, in an image outputted by a commonly used image forming apparatus adopting an electrophotography method, as resolution becomes higher, clear dots are less likely to be formed, so that contrast is not clear in this case, too (see FIGS. 6(a) and 6(b)).

Namely, the document outputted by an ink-jet printer or a commonly used image forming apparatus adopting the electrophotography method (the document is hereinafter referred to as "ink-jet and the like output document") tends to have smaller maximum density difference and smaller total density busyness than the halftone printing document. Therefore, by setting the threshold value of the maximum density difference and the threshold value of the total density busyness so that the values are small (the second maximum density difference threshold value THd2 and the second total density busyness threshold value THb2), it is possible to extract halftone dot pixels of both the halftone printing document and the ink-jet and the like output document (the first halftone dot pixel and the second halftone dot pixel). On the other hand, by setting the threshold values so that the values are large (the first maximum density difference threshold value THd1 (THd1>THd2) and the first total density busyness threshold value THb1 (THb1>THb2)), it is possible to extract only the halftone dot pixel of the halftone printing document (halftone: the first halftone dot pixel).

Note that, strictly speaking, in a case of (i) an office document which is outputted via the ink-jet method onto a normal paper and which includes a chart and a diagram and (ii) a picture which is outputted by an ink-jet image forming apparatus having a middle or low resolution, when the image of the document or the picture is formed by using dots with high density and density of the image is entirely low (the reason is mentioned later), the chart and the diagram and a picture area are judged to be halftone dots and image quality thereof does not deteriorate even when a process for a halftone dot area is performed with respect to the chart, the diagram, and the picture area. Therefore, the first halftone dot pixel is (i) a halftone dot used in the halftone printing and (ii) a pixel having the same characteristic as the halftone dot out of halftone dot pixels used to express halftones in an image forming apparatus adopting the ink-jet method or the electrophotography method. In the present embodiment, the halftone dot and the pixel having the characteristics are referred to as a "printing halftone dot".

With reference to flow charts illustrated in FIGS. 7 to 10, the following explains a document type discrimination process carried out by the automatic document type discrimination section 13 in the foregoing arrangement. Note that, in the following description, a block made of a plurality of pixels and including a current pixel has n×m (e.g. 15×15) pixels as an example.

With respect to the block made of n×m pixels and including the current pixel, the minimum density value calculating section 21 calculates the minimum density value (S1) and the maximum density value calculating section 22 calculates the maximum density value (S2). Next, the maximum density difference calculating section 23 calculates the maximum density difference of the block by using the calculated minimum density value and the calculated maximum density value (S3). On the other hand, the total density busyness calculating section 24 calculates the total of absolute values of density differences between adjacent pixels, namely, total density busyness (S4). A process for calculating the maximum density difference and a process for calculating the total density busyness may be performed sequentially or may be performed simultaneously.

Next, the judgment area setting section 25 compares the maximum density difference calculated by the maximum density difference calculating section 23 with (i) the first maximum density difference threshold value THd1 and (ii) the second maximum density difference threshold value THd2, and compares the total density busyness calculated by the total density busyness calculating section 24 with (i) the first total density busyness threshold value THb1 and (ii) the second total density busyness threshold value THb2 (S5, S6, S151, and S152 (see FIG. 8)).

When the maximum density difference is smaller than the first maximum density difference threshold value THd1 and the total density busyness is smaller than the first total density busyness threshold value THb1 (S6), the judgment area setting section 25 judges that the current pixel in the block belongs to the page background/photographic paper area (S7). On the other hand, when the condition is not satisfied in S6, the judgment area setting section 25 judges that the current pixel belongs to the text/halftone dot area (S9).

When it is judged in S7 that the current pixel belongs to the page background/photographic paper area, the page background/photographic paper judgment section 29 compares the maximum density difference of the block including the current pixel with the page background/photographic paper judgment threshold value (S8). When the result of the comparison shows that the maximum density difference is smaller than the page background/photographic paper judgment threshold value, the page background/photographic paper judgment section 29 judges that the current pixel belongs to the page background area (S11). When the result of the comparison shows that the maximum density difference is larger than the page background/photographic paper judgment threshold value, the page background/photographic paper judgment section 29 judges that the current pixel belongs to the photographic paper area (S12).

On the other hand, when it is judged in S9 that the current pixel belongs to the text/halftone dot area, the text/halftone dot judgment section 28 compares (i) a multiplication of the maximum density difference of the block including the current pixel and the text/halftone dot judgment threshold value with (ii) the total density busyness (S10). When the result of the comparison shows that the total density busyness is smaller than the value, the text/halftone dot judgment section 28 judges that the current pixel belongs to the text area (S13). When the result of the comparison shows that the total density busyness is larger than the value, the text/halftone dot judgment section 28 judges that the current pixel belongs to the halftone dot area (S14).

Figure 10:
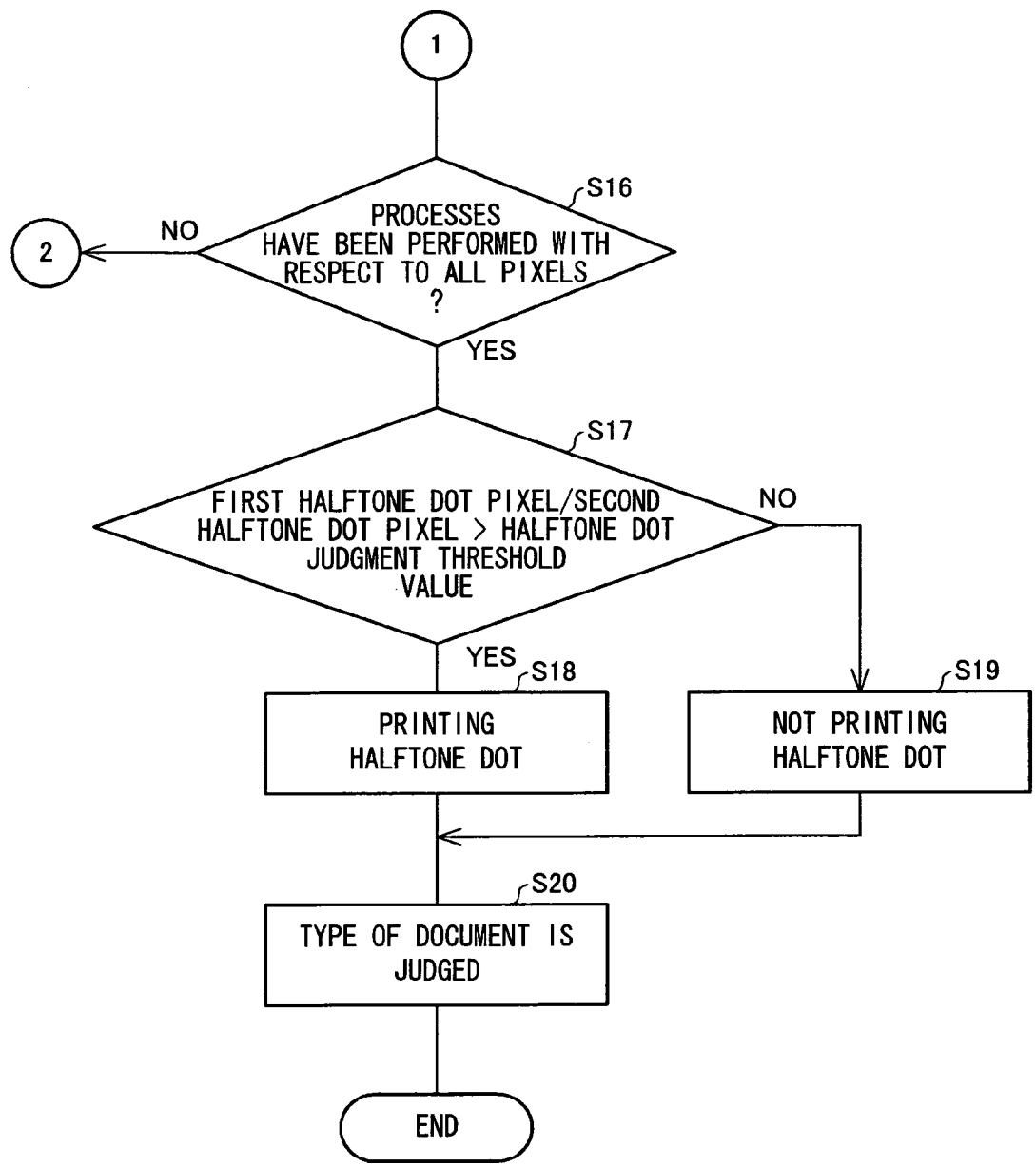
FIG. 10 is a flowchart illustrating a flow of the document type discrimination process carried out by the automatic document type discrimination section in a subsequent stage of the flowchart in FIG. 7.

Next, the automatic document type discrimination section 13 judges whether the foregoing judgments have been performed with respect to all pixels of the document image (S16: FIG. 10). When the judgments have not yet been performed with respect to all pixels, the process goes back to S1 and repeats the subsequent processes. On the other hand, when the judgments have been performed with respect to all pixels, the process goes through the S17 to S19, and the document judgment section 39 judges the type of the document (S20).

The automatic document type discrimination section 13 causes the second halftone dot pixel extracting section 32 to carry out a second halftone dot pixel extracting process (S15) while performing the processes of S5 to S14. The flowchart illustrated in FIG. 8 details the second halftone dot pixel extracting process.

The judgment area setting section 25 compares the maximum density difference calculated by the maximum density difference calculating section 23 with the second maximum density difference threshold value THd2, and compares the total density busyness calculated by the total density busyness calculating section 24 with the second total density busyness threshold value THb2 (S151 and S152).

With respect to the block judged to have the maximum density difference not less than the second maximum density difference threshold value THd2 and to have the total density busyness not less than the second total density busyness threshold value THb2, the pixel extracting section 41 of the second halftone dot pixel extracting section 32 compares (i) a multiplication of the maximum density difference and the text/halftone dot judgment threshold value with (ii) the total density busyness (S153). When the result of the comparison shows that the total density busyness is larger than the value, it is judged that the current pixel in the block belongs to the second halftone dot area (S155).

On the other hand, with respect to (i) a current pixel in the block judged in S152 to have the maximum density difference less than the second maximum density difference threshold value THd2 or to have the total density busyness less than the second total density busyness threshold value THb2, and (ii) a current pixel in the block judged in S153 to have the total density busyness less than the maximum density difference× the text/halftone dot judgment threshold value, the correction section 42 regards the current pixel as a candidate for a correction process and causes, if required, the current pixel to be subjected to the correction process (S154). With reference to a flowchart illustrated in FIG. 9 and FIG. 11, the following explains the correction process.

Figure 11:
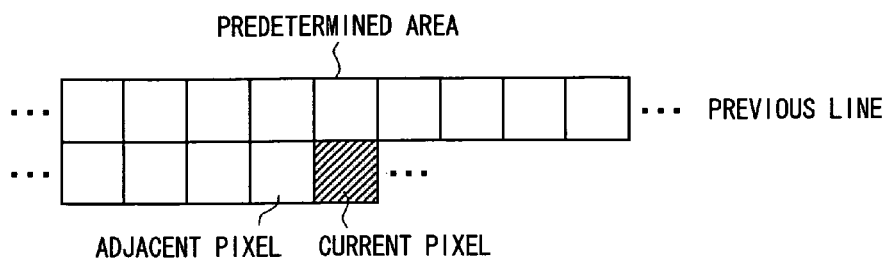
FIG. 11 is an explanatory drawing illustrating a correction process carried out by a correction section in FIG. 1.

First, as illustrated in FIG. 11, it is judged whether or not a pixel adjacent to the left side of the current pixel is judged to be the second halftone dot pixel (S161). Note that, it is assumed in FIG. 11 that a process goes from a left pixel to a right pixel and a pixel adjacent to the left side of the current pixel has been already subjected to the process. When the process goes from a right pixel to a left pixel, a pixel adjacent to the right side of the current pixel has been already subjected to the process. Further, the process goes from an above line to a below line.

Next, the number of pixels which are judged to be the second halftone dot pixels and which exist in a predetermined area of a previous line adjacent to the current pixel is counted (S162), and the counted number is compared with a predetermined threshold value THs (S163). When the result of the comparison shows that the number of the second halftone dot pixels is not less than the threshold value THs, the result of the judgment regarding the current pixel is changed to the second halftone dot pixel (S164). On the other hand, when the result of the comparison shows that the number of the second halftone dot pixels is less than the threshold value THs, the result of the judgment regarding the current pixel is not changed (S165).

The predetermined area of the previous line adjacent to the current pixel is selected so that the area includes a pixel adjacent to the current pixel. For example, the predetermined area is set so as to have 10 pixels or so. In accordance with sequential shift of the current pixel, the predetermined area is shifted in the same direction in which the current pixel is shifted. Note that, assuming that the predetermined area has 10 pixels or so, the threshold value THs is set to 3 for example.

As described above, the second halftone dot pixel extracting section 32 compares the maximum density difference with the second maximum density difference threshold value and compares the total density busyness with (i) the second total density busyness threshold value and (ii) the maximum density difference×the text/halftone dot judgment threshold value, and extracts, as the second halftone dot pixel, a pixel having a characteristic of the halftone dot pixel. Further, the second halftone dot pixel extracting section 32 extracts, as the second halftone dot pixel, a pixel capable of being regarded as the second halftone dot pixel on the basis of information of the predetermined area (the result of the judgment regarding the pixels around the current pixel) from pixels judged not to have the characteristic of the halftone dot pixel.

Note that, in the judgment carried out by the second halftone dot pixel extracting section 32 in S153, the maximum density difference×the text/halftone dot judgment threshold value is the value used in S10. However, the maximum density difference×the text/halftone dot judgment threshold value is not limited to the value in S10 and may be set to a different value. For example, the maximum density difference×the text/halftone dot judgment threshold value may be set to a value smaller than the value in S10. To be specific, if the value in S10 is 6, then the value in S153 may be set to 4.

Next, with reference to a flow chart in FIG. 10, the following explains a judgment carried out by the halftone dot pixel judgment section 37.

Assume that the number of the first halftone dot pixels counted by the first halftone dot pixel count section 34 is Cs1, the number of the second halftone dot pixels counted by the pixel count section 43 is Cs2, and the halftone dot pixel judgment threshold value set by the halftone dot pixel judgment threshold value setting section 38 is THs. When a condition $$Cs1/Cs2 > THs$$

is satisfied, the halftone dot pixel judgment section 37 judges that the document image includes a printing halftone dot (S17 and S18), and regards the counted number of the first halftone dot pixels as the counted number of halftone dots. On the other hand, when the condition is not satisfied, the halftone dot pixel judgment section 37 judges that the document image does not include a printing halftone dot (S17 and S19). In the judgment, the halftone dot pixel judgment threshold value THs is set to 0.15 for example. The halftone dot pixel judgment threshold value THs may be set to a suitable value on the basis of image samples.

Next, the following details the document type discrimination carried out by the document judgment section 39. The document judgment section 39 judges the type of a document in such a manner that: when the halftone dot pixel judgment section 37 judges that the document image has printing halftone dots as described above (S18 in FIG. 10), the document judgment section 39 judges pixels by using image data obtained in pre-scanning of the document, counts the number of judged pixels, and compares the counted number with predetermined threshold values of the page background area, the photographic paper area, the halftone dot area, and the text area, respectively, thereby judging the type of the document.

To be specific, when the ratio of the text area and the ratio of the halftone dot area are not less than threshold values, respectively, the document judgment section 39 judges that the document is a text/halftone printing document (text printing picture document). Further, assuming that detection accuracy is higher in the order of texts, halftone dots, and a photographic-picture, when the ratio of the text area is 30% of the number of all pixels, the document is judged to be a text document, when the ratio of the halftone dot area is 20% of the number of all pixels, the document is judged to be a halftone printing document (printing picture document), and when the ratio of the photographic-picture area is 10% of the number of all pixels, the document is judged to be a photographic-picture document.

Further, when the halftone dot pixel judgment section 37 judges that the document image does not include a printing halftone dot (corresponding to S19 in FIG. 10), the document judgment section 39 compares the counted number of the second halftone dot pixels with a predetermined threshold value THs2. When the result of the comparison shows that the counted number of the second halftone dot pixels is not less than the threshold value THs2, the document judgment section 39 judges that the document image is an image of a specific ink-jet and the like output document. When the counted number of the second halftone dot pixels is less than the threshold value THs2, the document judgment section 39 judges that the document image does not include a halftone dot area and the document judgment section 39 judges the type of the document on the basis of the ratio of the text area and the ratio of the photographic-picture area. Further, the threshold value THs2 specifies the ratio of the second halftone dot area in the document image as 20% of the number of all pixels for example.

Further, in the present embodiment, the document types judged by the document judgment section 39 are a text document, a text printing picture document, a printing picture document, a photographic-picture document, a text photographic-picture document, and a specific ink-jet and the like output document. Note that, the judgment of the document types may be performed by using image data once stored in storage means such as a hard disc instead of performing pre-scanning.

In the foregoing explanation, the halftone dot pixel judgment section 37 judges whether the document image includes a printing halftone dot by using the ratio of (i) the result of counting the first halftone dot pixel to (ii) the result of counting the second halftone dot pixel. However, instead of the ratio, there may be used the result of calculation performed with respect to the results of counting the first halftone dot pixel and the second halftone dot pixel, such as the result of adding the two results to each other or subtracting the two results from each other.

Further, in the foregoing, the correction process is performed in S154. However, the correction process is not essential. In a case where the correction process is not performed, when (i) the calculated maximum density difference is compared with the second maximum density difference threshold value and (ii) the calculated total density busyness is compared with the second total density busyness threshold value and the multiplication of the maximum density difference and the text/halftone dot judgment threshold value so as to judge the second halftone dot pixel, the second halftone dot pixel may be a pixel including a characteristic as a halftone dot pixel, and the halftone dot pixel judgment threshold value used in the halftone dot judgment process, which value is set by the halftone dot pixel judgment threshold value setting section 38, may be set to a high value such as 0.30.

Further, the foregoing explains how the automatic document type discrimination section 13 performs the judgment by using the maximum density difference and the total density busyness as characteristics. However, the characteristics are not limited to the maximum density difference and the total density busyness, and a run length or the number of pixel transition may be used as the characteristic. Further, the foregoing explains a case where it is judged whether a current pixel belongs to a page background area/photographic paper (photographic-picture) area or a text area/halftone dot area and then it is judged whether the current pixel belongs to a text area or a halftone dot area. However, the present invention may be arranged so that it is simultaneously judged whether a current pixel belongs to a text area, a halftone dot area, a photographic paper area, and a page background area. Further, a photographic paper area and a page background area may be integrally regarded as other area. Namely, at that time, at least a process for judging whether a current pixel belongs to a halftone dot area or not should be included.

Next, the following explains an example of processes carried out by the subsequent sections on the basis of the result of judgment carried out by the automatic document type discrimination section 13 after the type of the document has been estimated.

When it is judged that a document image includes only one area, the same process as the segmentation process as described above is carried out. On the other hand, when it is judged that the document image includes a plurality of areas, an intermediate parameter of parameters used in a process for each area is used and the parameter used in a process for an area which is not recognized in the document type discrimination process is not used.

For example, when it is judged that an input image (document) is a text document, a correction curve for removing much high light or enhancing contrast is used in an input tone correction process.

Further, a color correction process putting high values on saturation is performed with respect to color texts, while a black generation and under color removal process is performed with respect to black texts so that a large amount of black is generated. Further, with respect to texts, there is performed switching of parameters or other similar operations, such as setting a filter coefficient so that edge is emphasized in a spatial filter process and smoothing is less performed in a smoothing process.

When it is judged that the input image is a text photographic-picture document, a process using an intermediate parameter of parameters used in the text document process and the photographic-picture document process is performed in each of the processes. Depending on which one of a text document and a photographic-picture document is considered more important, the input tone correction process is performed so that high light is removed and contrast is adjusted by using an intermediate parameter of parameters used in the photographic-picture document process and the text document process, or the color correction process is performed so that intensity of color saturation or characteristics of tone are not extremely off-balance.

In the present embodiment, when an ink-jet document is read, the type of the document is judged as follows.

(1) In Case of an Office Document Outputted onto a Normal Paper (e.g. Drawings and Tables)

When the table or similar component includes only lineal drawings and texts, the document is recognized as a "text document" and therefore can be processed in the same manner as a text document such as printings.

When the drawing or similar component is colored, the document is recognized as "text printing document" because the drawing is recognized as halftone dots. The drawing recognized as the halftone dots is subjected to the smoothing process so as to suppress moire, thereby suppressing rough graininess.

An ink-jet document outputted onto a normal paper is less shaper than an image outputted onto a paper exclusive to picture and is outputted with somber color. Therefore, it is preferable that the color correction process is performed with a color correction table for printing.

(2) Picture Outputted onto a Paper Exclusive to Picture by an Ink-jet Image Forming Apparatus with a High Resolution When a picture outputted by an ink-jet image forming apparatus with a high resolution (2880 dpi or so) is read by a scanner with a resolution of 600 dpi (the scanner may be an independent scanner or a scanner of a color copying machine), the scanner cannot read almost all pixels of the picture. As a result, the picture is recognized as a "photographic-picture document". Rough graininess is not generated because the pixels are not read. Besides, the color reproduction area of a photographic-picture is close to the color reproduction area of a picture outputted through the ink-jet method onto a paper exclusive to picture. Therefore, there is no problem in performing the photographic-picture process.

(3) Picture Outputted by an Ink-jet Image Forming Apparatus with a Low or Middle Resolution When a picture outputted by an ink-jet image forming apparatus with a low or middle resolution (1200 dpi or so) is read by a scanner with a resolution of 600 dpi, a part of pixels can be read out. For example, a low-density area in a document which is outputted by the ink-jet image forming apparatus with a low or middle resolution has low-density pixels. Namely, the interval between the pixels is large, so that an image reading apparatus with a low resolution can judge whether pixels exist or not. On the other hand, as density increases, the image reading apparatus with a low resolution gets gradually incapable of judging whether pixels exist or not, with a result that it is difficult to discriminate the picture from a photographic paper area. This case is classified into the following three cases.

(a) A Case where an Image is Formed with High-density Dots and Density of the Image is Low as a Whole (the Interval between the Dots is Large)

When the density of the image is low as a whole, dots are scattered. The number of halftone dot pixels (the number of the first and second halftone dot pixels) is counted on the whole area of the image, so that the image is judged to be a "printing picture document (alternatively, a text printing picture document)". At that time, an area judged to be halftone dots is subjected to a smoothing process for suppressing moiré. Further, the image has low density as a whole, so that there is no problem in performing a color correction process for a printing picture.

(b) A Case where Density of an Image is High as a Whole

When the density of the image is high as a whole, Dots exist densely and an area judged to be halftone dot pixels (first and second halftone dot pixels) hardly exists, so that the image is judged to be a "photographic-picture document". Pixels are not read on the whole area of the image, so that rough graininess does not occur.

(c) A Case where an Image is Formed with High-density Dots and a Low-density area and a High-density area are Mixed in the Image, or a Case where an Image is Formed with Low-density Dots At that time, there are few halftone dots (first halftone dot pixels) and the high-density area and the low-density area are mixed in the image, so that the image may be judged to be a printing picture document or a photographic-picture document according to the contents of the image. Thus, the result of the judgment is not constant. Examples of this condition are as follows:

1. The result changes according to whether the document is placed in a longitudinal direction or in a lateral direction.
2. The result greatly changes if an image of a document is edited a little and outputted by an ink-jet image forming apparatus, and the outputted image is read by a scanner and outputted.
3. With respect to second halftone dot pixels, the result of the judgment does not change greatly because the second halftone dot pixels are subjected to the correction process. However, with respect to first halftone dot pixels, the result of the judgment greatly changes.

When the image is judged to be a printing picture document, rough graininess does not occur in the low-density area. However, tone distortion may occur in the high-density area (a dark area and a vivid area). Further, when the image is judged to be a photographic-picture, tone distortion does not occur in the high-density area. However, rough graininess may occur in the low-density area.

The above phenomena are also applicable to an image outputted by a commonly used image forming apparatus adopting an electrophotography method.

As described above, deterioration in image quality may occur in the case of (3)-(c). Therefore, the case is judged to be a specific ink-jet and the like output document, so that it is possible to reproduce, with high quality, images of all types of documents outputted by an image forming apparatus adopting the ink-jet method or to reproduce, with high quality, images of documents outputted by an image forming apparatus adopting the electrophotography method.

The specific-ink-jet and the like output document is processed by the sections of the image processing apparatus as follows.

(Segmentation Process Section)

The specific ink-jet and the like output document is not subjected to the segmentation process. Alternatively, the specific ink-jet and the like output document is judged so that: a single process is performed with respect to the whole area of the image so as to prevent deterioration in the image, which deterioration is caused in such a manner that the image is judged to have a halftone printing area and a photographic-picture area and a process performed with respect to the image is switched. For example, the whole area of the image is judged to be an ink-jet print area or an electrophotography printing area.

(Color Correction Section)

Just like the case of the photographic -picture, the color correction section performs a conversion for preventing tone distortion in the high-density area. A color correction table for the photographic-picture may be used for the conversion.

(Black Generation and Under Color Removal Section)

The amount of black generation and the amount of under color removal are set so that tone distortion does not occur in the dark area.

(Spatial Filter Process Section)

There is used a filter for performing an enhancement process with respect to a low frequency area and for performing a smoothing process with respect to a high frequency filter.

The filter is set so that the strength of the enhancement process is lower than that of a text document and the degree of the smoothing process is lower than that of a halftone printing picture document.

(Tone Reproduction Process Section)

As with the case of a photographic-picture document, the tone reproduction process putting emphasis on tones is performed. For example, the size of a dither matrix is enlarged in a dither process and a diffusion matrix is enlarged in an error diffusion process.

The foregoing explains a method for judging the type of a document. However, the present invention may be arranged so that: instead of judging the type of a document, there is outputted a control signal for indicating that (i) the ratio of the counted number of first halftone dot pixels to the counted number of second halftone dot pixels is not more than the halftone dot pixel judgment threshold value and (ii) the counted number of the second halftone dot pixels is not less than the threshold value THs2, thereby controlling the subsequent processes of the segmentation section 15, the color correction section 16, the black generation and under color removal section 17, the spatial filter process section 18, and the tone reproduction process section 20.

Embodiment 2

The following explains another embodiment of the present invention. Note that, members having the same functions as those described in Embodiment 1 are given the same signs.

Figure 13:
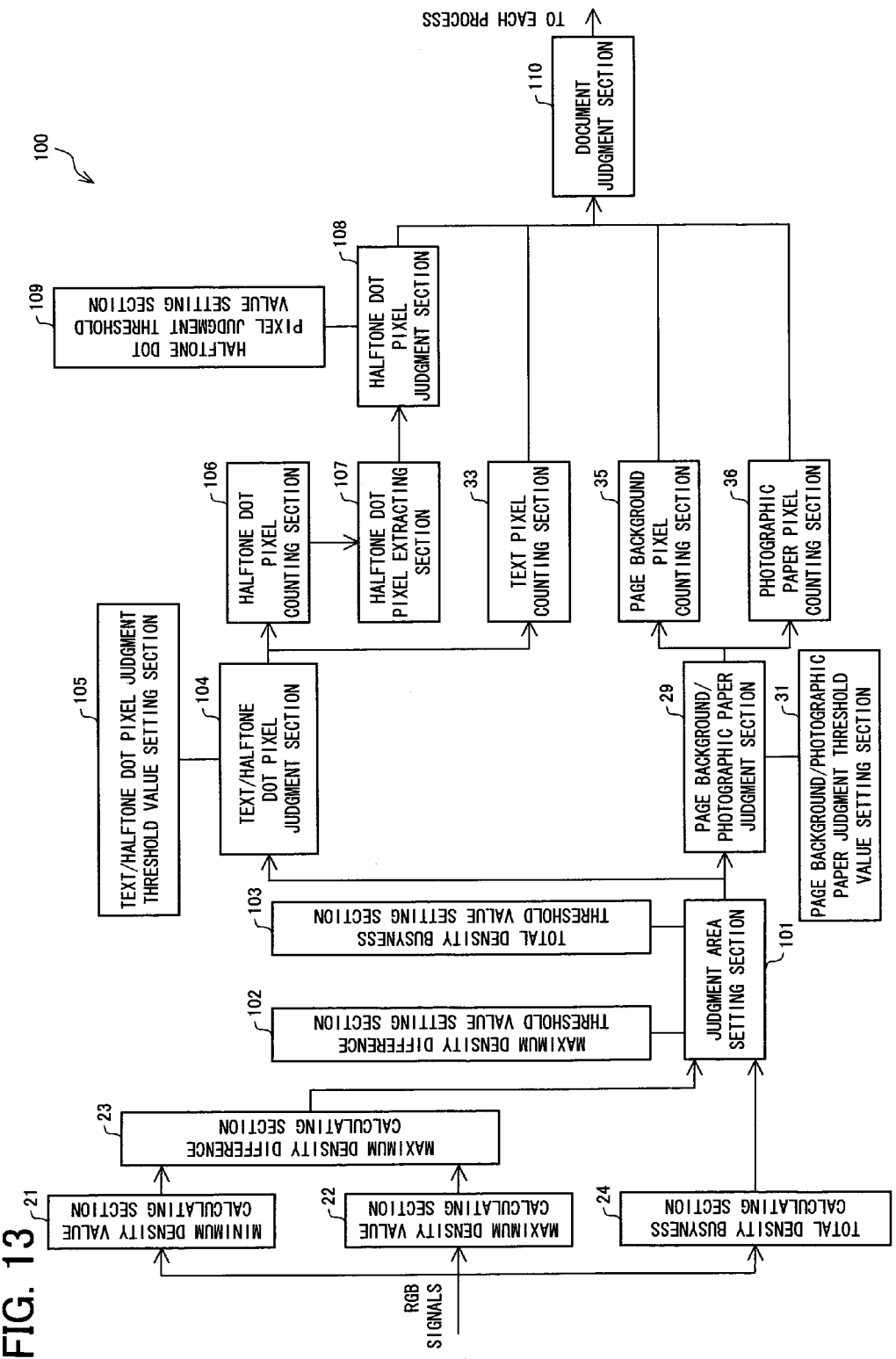
FIG. 13 is a block diagram illustrating a structure of an automatic document type discrimination section included in an image processing apparatus according to another embodiment of the present invention.

FIG. 13 is a block diagram illustrating the structure of an automatic document type discrimination section included in an image processing apparatus according to another embodiment of the present invention. A digital color copying machine according to the present embodiment includes an automatic document type discrimination section (discrimination means) 100 illustrated in FIG. 13, instead of the automatic document type discrimination section 13. First, the automatic document type discrimination section 100 detects halftone dot pixels (pixels constituting a halftone dot area) by using a first characteristic, and extracts, from the detected halftone dot pixels, first halftone dot pixels (halftone dots) by using a second characteristic other than the first characteristic. Next, the automatic document type discrimination section 100 calculates the number of the first halftone dot pixels and the number of the second halftone dot pixels (the number of the halftone dot pixels—the number of the first halftone dot pixels), and compares the numbers with threshold values, thereby identifying a specific printing document.

The automatic document type discrimination section 100 according to the present embodiment includes: a minimum density value calculating section 21; a maximum density value calculating section 22; a maximum density difference calculating section 23; a total density busyness calculating section 24; a judgment area setting section 101; a maximum density difference threshold value setting section 102; a total density busyness threshold value setting section 103; a text/halftone dot pixel judgment section (halftone dot pixel detecting section) 104; a text/halftone dot pixel judgment threshold value setting section 105; a page background/photographic-picture judgment section 29; a page background/photographic-picture judgment threshold value setting section 31; a text pixel counting section 33; a halftone dot pixel counting section 106; a halftone dot pixel extracting section 107; a halftone dot pixel judgment section (type determining section) 108; a halftone dot pixel judgment threshold value setting section (type determining section) 109; a page background pixel count section 35; a photographic-picture pixel counting section 36; and a document judgment section (type determining section) 110.

The minimum density value calculating section 21 calculates the minimum density value in a block which is made of a plurality of pixels and which includes a current pixel. The maximum density value calculating section 22 calculates the maximum density value in the block. The maximum density difference calculating section 23 calculates the maximum density difference of the block by using the minimum density value calculated by the minimum density value calculating section 21 and the maximum density value calculated by the maximum density value calculating section 22. The total density busyness calculating section 24 calculates the total of absolute values of differences in density between adjacent pixels in the block.

The judgment area setting section 101 compares the maximum density difference calculated by the maximum density difference calculating section 23 with the maximum density difference threshold value THd, and compares the total density busyness calculated by the total density busyness calculating section 24 with the total density busyness threshold value THb given from the total density busyness threshold value setting section 27, thereby judging whether the current pixel in the block belongs to a page background area/photographic paper (photographic-picture) area or a text area/halftone dot area.

On the basis of the maximum density difference calculated by the maximum density difference calculating section 23, the maximum density difference threshold value setting section 102 sets the maximum density difference threshold value THd used to judge whether a current pixel belongs to a page background area/photographic paper (photographic-picture) area or a text area/halftone dot area.

On the basis of the total density busyness calculated by the total density busyness calculating section 24, the total density busyness threshold value setting section 103 sets the total density busyness threshold value THb used to judge whether the current pixel belongs to the page background area/photographic paper area or the text area/halftone dot area.

With respect to a pixel judged by the judgment area setting section 101 to belong to the text/halftone dot area, the text/halftone dot pixel judgment section 104 judges whether the pixel belongs to the text area or the halftone dot area. Here, as described above, the maximum density difference and the total density busyness are regarded as the characteristic (first characteristic) and the characteristic is compared with predetermined threshold values, thereby judging whether the pixel belongs to the text area or the halftone dot area. The text/halftone dot pixel judgment threshold value setting section 105 sets a text/halftone dot pixel judgment threshold value used by the text/halftone dot pixel judgment section 104 to perform the judgment.

With respect to a pixel judged by the judgment area setting section 25 to belong to the page background area/photographic paper area, the page background/photographic paper judgment section 29 judges whether the pixel belongs to a page background area or a photographic paper area (photographic-picture area, continuous tone area). The page background/photographic paper judgment threshold value setting section 31 sets a page background/photographic paper judgment threshold value used by the page background/photographic paper judgment section 29 to perform the judgment.

The text pixel counting section 33 counts the number of pixels judged by the text/halftone dot pixel judgment section 104 to belong to the text area. The halftone dot pixel counting section 106 counts the number of pixels judged by the text/halftone dot pixel judgment section 104 to belong to the halftone dot pixel.

The halftone dot pixel extracting section 107 is provided in a subsequent stage of the halftone dot pixel counting section 106, and extracts pixels belonging to printing halftone dots (first halftone dot pixel) from pixels judged to belong to the halftone dot pixels. At that time, the halftone dot pixel extracting section 107 extracts the pixels belonging to printing halftone dots by using a characteristic (second characteristic) different from the characteristic used in the text/halftone dot pixel judgment section 104.

Note that, the pixels belonging to printing halftone dots are (i) pixels belonging to halftone dots used in a halftone printing as described above and (ii) pixels whose tone reproduction is performed by an image forming apparatus adopting the ink-jet method or the electrophotography method and whose image quality does not deteriorate when a process is performed with respect to the halftone dot area.

The halftone dot pixel judgment section 108 uses (i) the result of counting carried out by the halftone dot pixel counting section 106 with respect to the halftone dot pixels, (ii) the result of detection carried out by the halftone dot pixel extracting section 107 with respect to pixels belonging to printing halftone dots (first halftone dot pixel), and (iii) the halftone dot pixel judgment threshold value given from the halftone dot pixel judgment threshold value setting section 109, thereby judging whether a current pixel belongs to a printing halftone dot (halftone dot) or not.

To be specific, with respect to a block including a current pixel, the halftone dot pixel judgment section 108 extracts the number of pixels belonging to printing halftone dots (first halftone dot pixel), which is obtained by the halftone dot pixel extracting section 107, from the number of the halftone dot pixels counted by the halftone dot pixel counting section 106, thereby obtaining the number of the second halftone dot pixels. Next, the halftone dot pixel judgment section 108 compares (i) the ratio of the number of the first halftone dot pixels to the number of the second halftone dot pixels with (ii) the halftone dot pixel judgment threshold value given from the halftone dot pixel judgment threshold value setting section 109, thereby judging whether the current pixel belongs to a printing halftone dot (halftone dot). The halftone dot pixel judgment threshold value setting section 109 sets a halftone dot pixel judgment threshold value used in the halftone dot pixel judgment section 108.

The page background pixel counting section 35 counts the number of pixels judged by the page background/photographic paper judgment section 29 to belong to a page background. The photographic paper pixel counting section 36 counts the number of pixels judged by the page background/photographic paper judgment section 29 to belong to a photographic-picture area. Note that, the numbers are counted on whole areas of the document.

The document judgment section 110 judges the type of a document on the basis of the results of counting carried out by the halftone dot pixel judgment section 108, the text pixel counting section 33, the page background pixel counting section 35, and the photographic paper pixel counting section 36 (e.g. by comparing the results with predetermined threshold values). Note that, the process here can be performed with a well known method.

Figure 14:
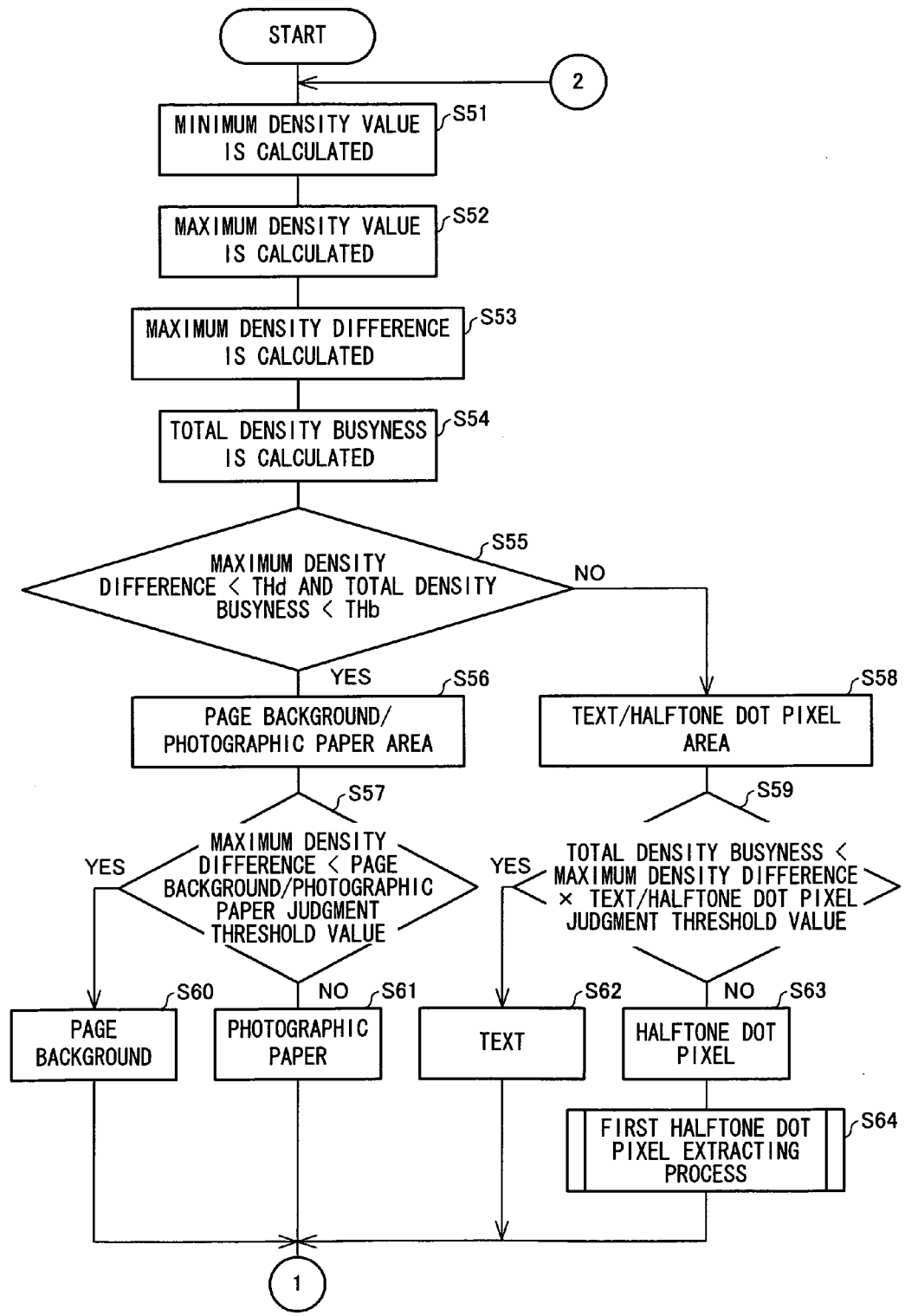
FIG. 14 is a flowchart illustrating a flow of a document type discrimination process carried out by the automatic document type discrimination section illustrated in FIG. 13.
Figure 15:
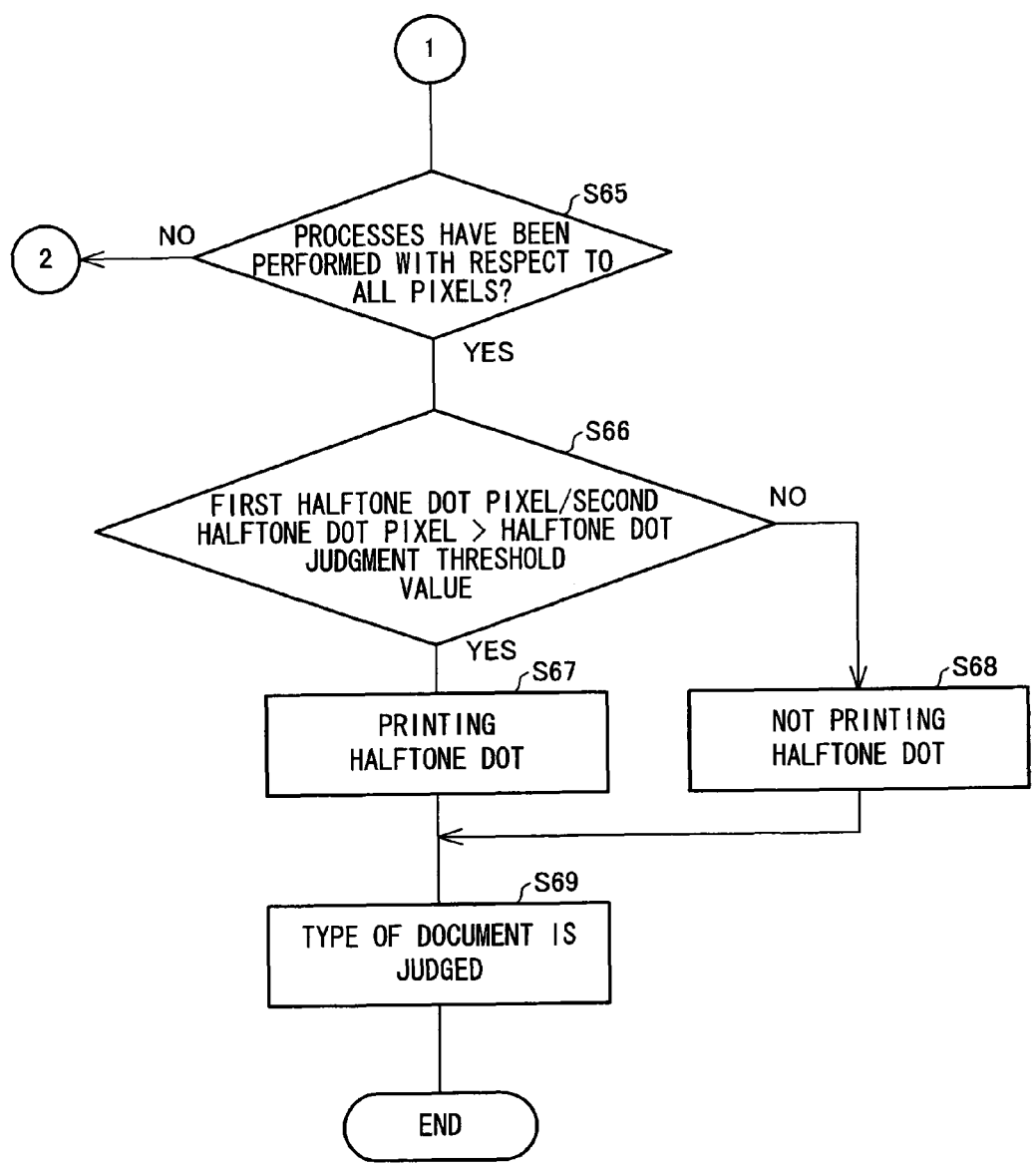
FIG. 15 is a flowchart illustrating a flow of the document type discrimination process carried out by the automatic document type discrimination section in a subsequent stage of the flowchart in FIG. 14.
Figure 16:
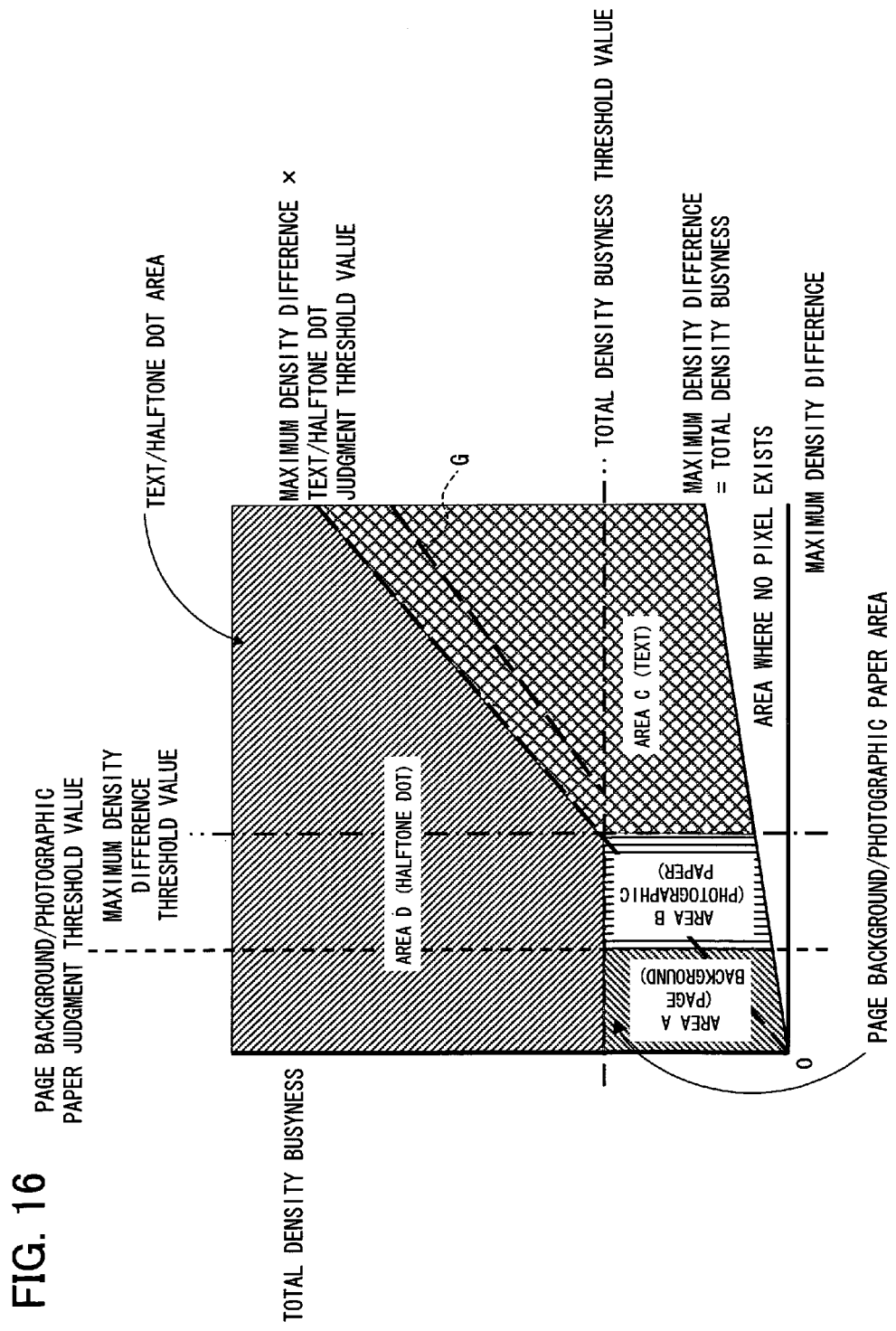
FIG. 16 is a graph illustrating a relation between the maximum density difference and total density busyness of each area in FIG. 3 both of which are used in the automatic document type discrimination section in FIG. 13.

Next, with reference to flow charts illustrated in FIGS. 14 and 15 and to FIG. 16, the following explains a document type discrimination process carried out by the automatic document type discrimination section 100. Note that, FIG. 16 is a graph illustrating a relation between the maximum density difference and total density busyness of each area in FIG. 3, the maximum density difference and the total density busyness being used in the automatic document type discrimination section 100 in FIG. 13. In the following description, a block made of a plurality of pixels and including a current pixel has n×m (e.g. 15×15) pixels for example.

With respect to the block having n×m pixels including the current pixel, the minimum density value calculating section 21 calculates the minimum density value (S51) and the maximum density value calculating section 22 calculates the maximum density value (S52). Next, the maximum density difference calculating section 23 calculates the maximum density difference of the block by using the calculated minimum density value and the calculated maximum density value (S53). On the other hand, the total density busyness calculating section 24 calculates the total of absolute values of density differences between adjacent pixels, namely, total density busyness (S54). A process for calculating the maximum density difference and a process for calculating the total density busyness may be performed sequentially or may be performed simultaneously.

Next, the judgment area setting section 25 compares the maximum density difference calculated by the maximum density difference calculating section 23 with a maximum density difference threshold value THd, and compares the total density busyness calculated by the total density busyness calculating section 24 with a total density busyness threshold value THb (S55).

When the maximum density difference is smaller than the maximum density difference threshold value THd and the total density busyness is smaller than the total density busyness threshold value THb, the judgment area setting section 25 judges that the current pixel in the block belongs to the page background/photographic paper area (S56). On the other hand, when the condition is not satisfied, the judgment area setting section 25 judges that the current pixel belongs to the text/halftone dot area (S58).

When it is judged that the current pixel belongs to the page background/photographic paper area (S55, S56), the page background/photographic paper judgment section 29 compares the maximum density difference of the block including the current pixel with the page background/photographic paper judgment threshold value (S57). When the result of the comparison shows that the maximum density difference is smaller than the page background/photographic paper judgment threshold value, the page background/photographic paper judgment section 29 judges that the current pixel belongs to the page background area (S60). When the result of the comparison shows that the maximum density difference is larger than the page background/photographic paper judgment threshold value, the page background/photographic paper judgment section 29 judges that the current pixel belongs to the photographic paper area (S61).

On the other hand, when it is judged that the current pixel belongs to the text/halftone dot area (S55, 58), the text/halftone dot pixel judgment section 104 compares (i) a multiplication of the maximum density difference of the block including the current pixel and the text/halftone dot pixel judgment threshold value with (ii) the total density busyness (S59). When the result of the comparison shows that the total density busyness is smaller than the value, the text/halftone dot pixel judgment section 104 judges that the current pixel belongs to the text area (S62). When the result of the comparison shows that the total density busyness is larger than the value, the text/halftone dot pixel judgment section 104 judges that the current pixel belongs to the halftone dot area (S63).

Note that, in the judgment in S59, as illustrated in FIG. 16, the multiplication of the maximum density difference and the text/halftone dot pixel judgment threshold value, which multiplication is denoted G, is set to a value smaller than the multiplication of the maximum density difference and the text/halftone dot judgment threshold value in FIG. 4, so that it is possible to detect a halftone dot area including the second halftone dot area.

Next, pixels belonging to printing halftone dots (first halftone dot pixel) are extracted from pixels judged to be halftone dot pixels through S59 and S63 (S64). Here, the first halftone dot pixel is extracted in such a manner that: the characteristic (second characteristic) other than the maximum density and the total density busyness is obtained from image data and the extraction is performed based on the characteristic.

Thereafter, the automatic document type discrimination section 100 judges whether or not the foregoing processes have been performed with respect to all pixels of the document image (S65: FIG. 15). When the processes have not yet been performed with respect to all pixels, the process goes back to S51 and repeats the subsequent processes. On the other hand, when the processes have been performed with respect to all pixels, the process goes through the S66 to S69, and the document judgment section 39 judges the type of the document (S69).

Next, with reference to a flow chart in FIG. 15, the following explains a judgment carried out by the halftone dot pixel judgment section 108.

Assume that: the number of the first halftone dot pixels counted by the halftone dot pixel extracting section 107 is Cs1, the number of the second halftone dot pixels obtained by subtracting Cs1 from the number of halftone dot pixels counted by the halftone dot pixel counting section 106 is Cs2, and the halftone dot pixel judgment threshold value set by the halftone dot pixel judgment threshold value setting section 109 is THs. When a condition $$Cs1/Cs2 > THs$$

is satisfied, the halftone dot pixel judgment section 108 judges that the area is printing halftone dots (S66 and S67), and regards the counted number of the first halftone dot pixels as the counted number of halftone dots. On the other hand, when the condition is not satisfied, the halftone dot pixel judgment section 108 judges that the area is not printing halftone dots (S66 and S68). In the judgment, the halftone dot pixel judgment threshold value THs is set to 0.15 for example. The halftone dot pixel judgment threshold value THs may be set to a suitable value on the basis of image samples.

The automatic document type discrimination section 100 according to the present embodiment is arranged as follows: the automatic document type discrimination section 100 causes the halftone dot pixel count section 106 to detect halftone dot pixels (pixels constituting a halftone dot area) by using the first characteristic. Next, the automatic document type discrimination section 100 causes the halftone dot pixel extracting section 107 to extract the first halftone dot pixels (halftone dots) from the detected halftone dot pixels by using the second characteristic different from the first characteristic. The following explains arrangement examples for realizing the condition. Note that, in the arrangement examples, the process in S64 in FIG. 14 is performed.

(1) Arrangement Example 1 of Halftone Dot Pixel Extracting Section

Figure 17:
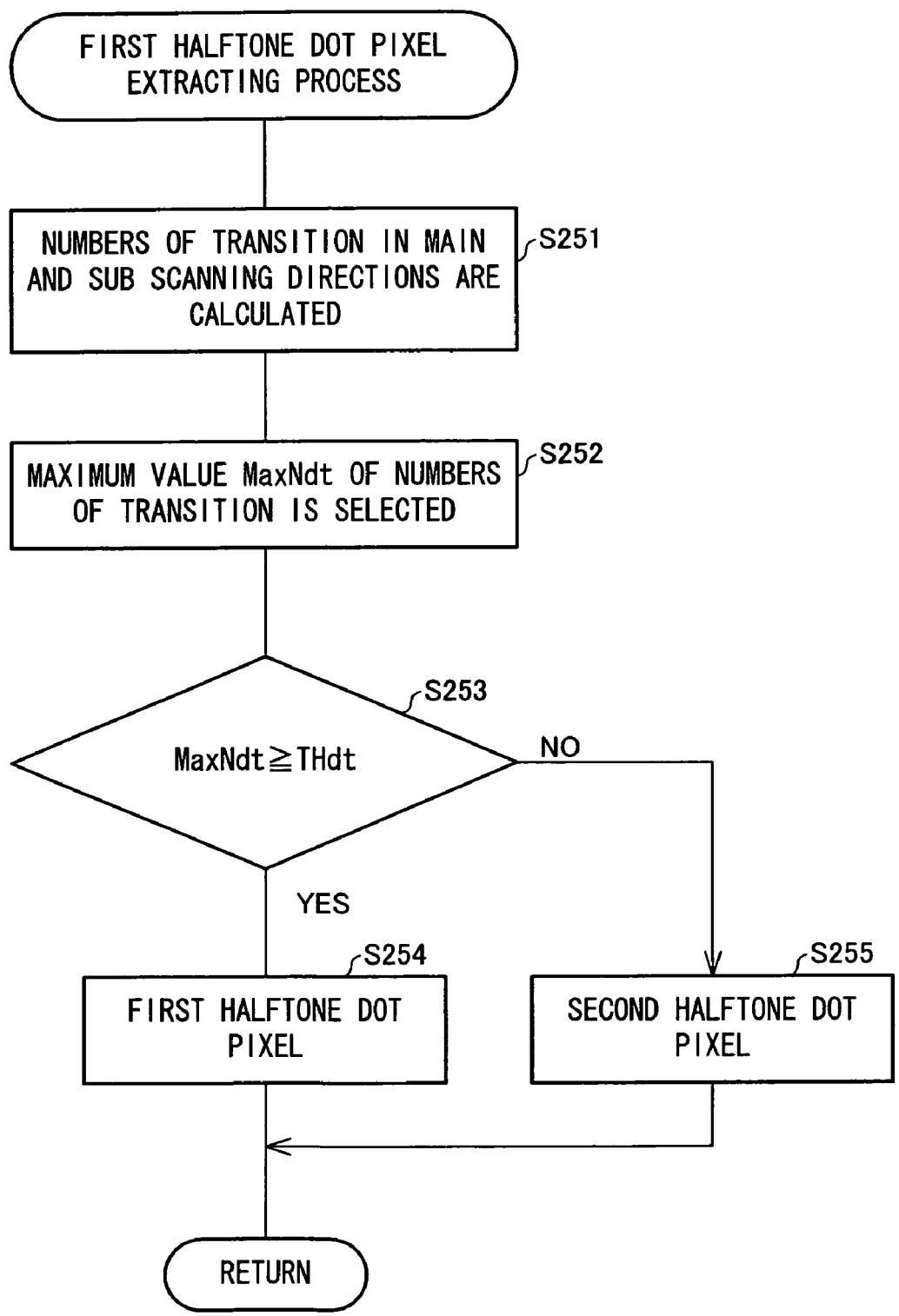
FIG. 17 is a flowchart illustrating how a halftone dot pixel extracting section in FIG. 13 operates in a case where the number of image density transition is used as a characteristic by which first halftone dot pixels are extracted.
Figure 18:
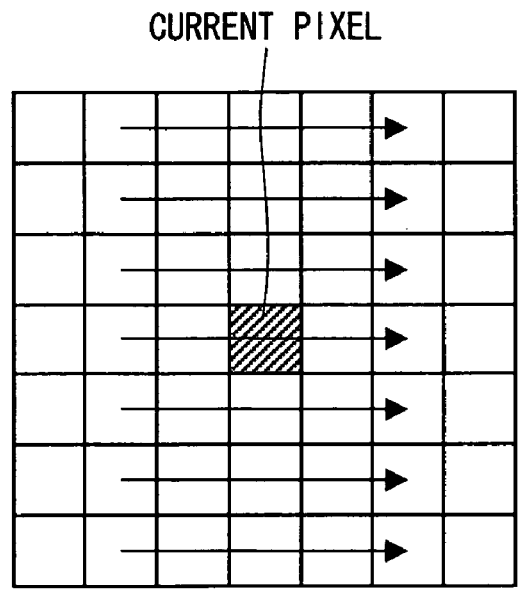
FIG. 18(a) is an explanatory drawing illustrating a process for counting the number of image density transition in a main scanning direction in a block having a plurality of pixels and centering a current pixel in the process in FIG. 17.
FIG. 18(b) is an explanatory drawing illustrating a process for counting the number of image density transition in a sub scanning direction in the block.
Figure 18:
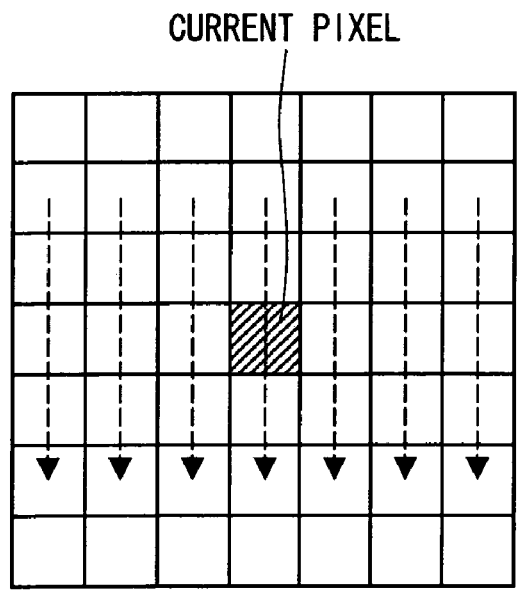
Figures 19, 20:
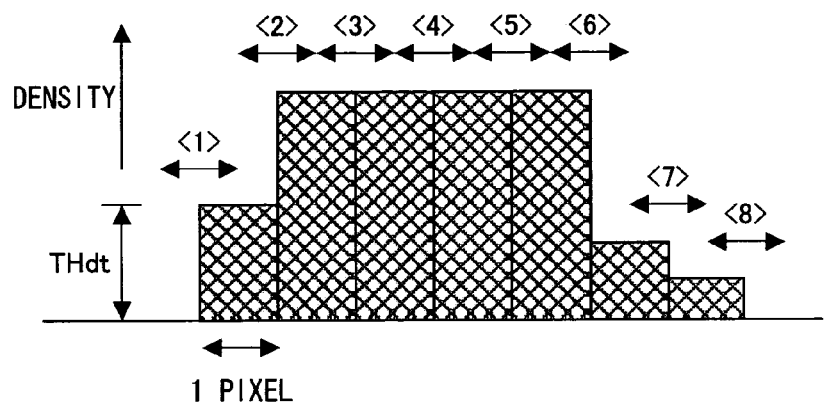
FIG. 19 is an explanatory drawing illustrating an example of a relation between (i) a threshold value by which it is judged whether image density is transited or not and (ii) density of each pixel in the process in FIG. 17.
FIG. 20 is an explanatory drawing illustrating "rising" and "falling" of density between pixels in FIG. 19.

FIG. 17 is a flowchart explaining the operation of the halftone dot pixel extracting section 107 in the arrangement example 1. FIG. 18(a) explains a process for counting the number of image density transition in a main scanning direction in a block having a plurality of pixels and centering a current pixel. FIG. 18(b) explains a process for counting the number of image density transition in a sub scanning direction in the block. Further, FIG. 19 explains an example of a relation between (i) a threshold value by which it is judged whether image density is transited or not and (ii) density of each pixel. FIG. 20 explains "rising" and "falling" of density between pixels in FIG. 19.

In the arrangement example 1, the number of image density transition is used as a characteristic by which the first halftone dot pixel is extracted (second characteristic). To be specific, in a block having 7×7 pixels for example and centering a current pixel, the halftone dot pixel extracting section 107 obtains the number of image density transition both in a main scanning direction and in a sub scanning direction (S251). Next, the larger one (MaxNdt) of the numbers of image density transition is selected (S252). Next, the selected number of image density transition (MaxNdt) is compared with a threshold value THdt (set to 6 for example) (S253). When the result of the comparison shows that the number of image density transition (MaxNdt) is not less than THdt, it is judged that the current pixel belongs to the first halftone dot pixel (S254). When the result of the comparison shows that the number of image density transition (MaxNdt) is less than THdt, it is judged that the current pixel belongs to the second halftone dot pixel (S255).

In this way, by regarding the number of image density transition as the characteristic used to extract the first halftone dot pixel, it is possible to suitably extract the first halftone dot pixel. This is because: the first halftone dot pixels (halftone dots) have sharp contrast in density, while the second halftone dot pixels outputted by an ink-jet image forming apparatus (printer, copying machine, or multifunction printer) do not have sharp contrast in density. Namely, by setting the threshold value THdt to a value larger than the scope of changes in contrast of the second halftone dot pixels, it is possible to suitably extract the first halftone dot pixels.

Next, the following explains how to obtain the number of image density transition. For example, the number of image density transition in the main scanning direction is obtained as follows: the value of the difference in density between pixels adjacent to each other in the main scanning direction (the value of a pixel at the right side-the value of a pixel at the left side) is obtained. When the difference is not less than a predetermined threshold value (e.g. 30), it is judged that "rising" (the difference value is plus) or "falling" (the difference value is minus) exists. Then, when "falling" is detected after "rising", or when "rising" is detected after "falling", it is considered that image density transition occurs and the image density transition is counted.

To be specific, the following explains a case where an image has density distribution illustrated in FIG. 19. Here, the threshold value THdt is a value equal to the density value of the pixel at the left end. "Rising" and "falling" between pixels in FIG. 19 are shown in FIG. 20. Note that, <1> to <8> illustrated in FIGS. 19 and 20 are areas in which the difference in density between adjacent pixels are examined.

In FIG. 20, falling in <6> is detected after rising in <1>, and "1" is counted as the number of image density transition.

(2) Arrangement Example 2 of Halftone Dot Pixel Extracting Section

Figure 21:
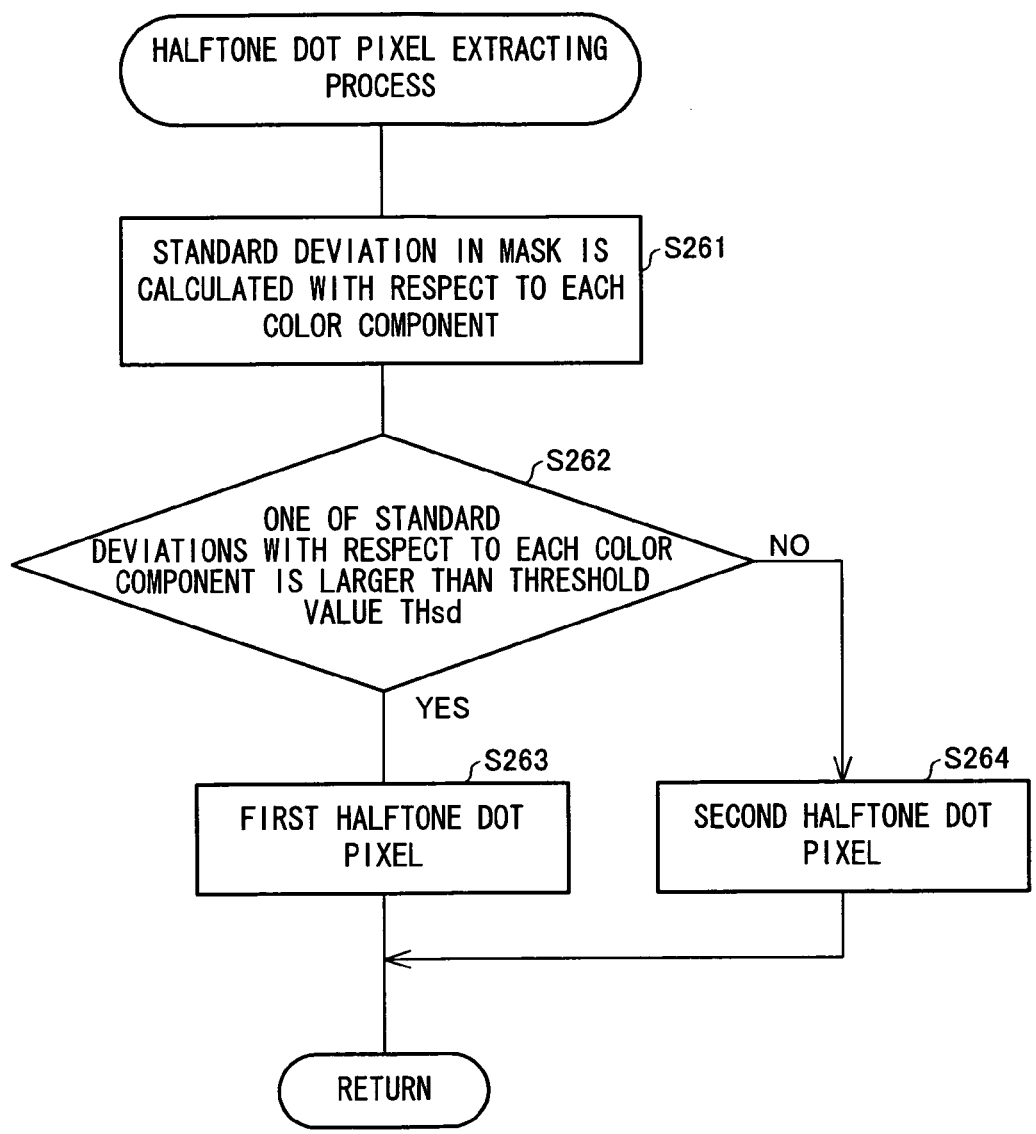
FIG. 21 is a flowchart illustrating how the halftone dot pixel extracting section in FIG. 13 operates in a case where a standard deviation of pixel values is used as a characteristic by which first halftone dot pixels are extracted.

FIG. 21 is a flowchart illustrating the operation of the halftone pixel extracting section 107 in the arrangement example 2. In the arrangement example 2, standard deviation of pixel values (density values) in a block having a plurality of pixels and centering a current pixel is used as a characteristic by which the first halftone dot pixel is extracted (second characteristic). To be specific, the halftone dot pixel extracting section 107 obtains standard deviation σ of pixel values with respect to each plane (each color component) in a block having 5×5 pixels for example and centering a current pixel (S261). The standard deviation σ can be obtained by equation (1) as indicated below.

[Equation 1]

Next, the halftone dot pixel extracting section 107 judges whether one of the standard deviations a with respect to each color component is more than a threshold value THsd (e.g. 15) or not (S262). When the result of the judgment shows that one of the standard deviations σ with respect to each color component is more than the threshold value THsd, the halftone dot pixel extracting section 107 judges that the current pixel is the first halftone dot pixel. When the result of the judgment shows that one of the standard deviations σ with respect to each pixel is not more than the threshold value THsd, the halftone dot pixel extracting section 107 judges that the current pixel is the second halftone dot pixel.

In this way, by regarding the standard deviation σ with respect to each color component as the characteristic by which the first halftone dot pixel is extracted, it is possible to suitably extract the first halftone dot pixel. This is because: the first halftone dot pixels (printing halftone dots) have sharp contrast in density and therefore have larger standard deviation σ than the second halftone dot pixels which do not have sharp contrast in density.

(3) Arrangement Example 3 of Halftone Dot Pixel Extracting Section

Figure 22:
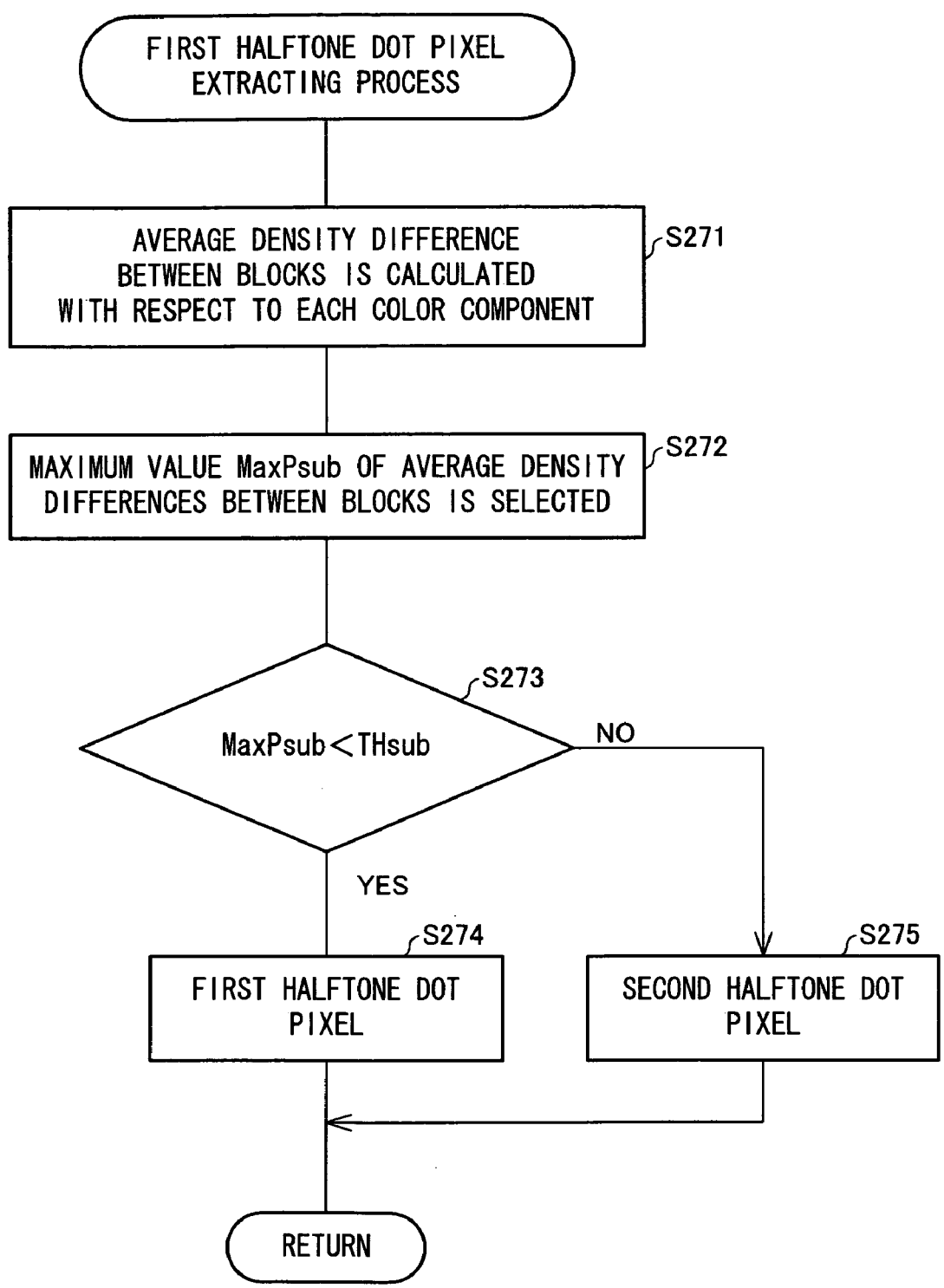
FIG. 22 is a flowchart illustrating how the halftone dot pixel extracting section in FIG. 13 operates in a case where an average density difference of a block is used as a characteristic by which first halftone dot pixels are extracted.
Figure 23:
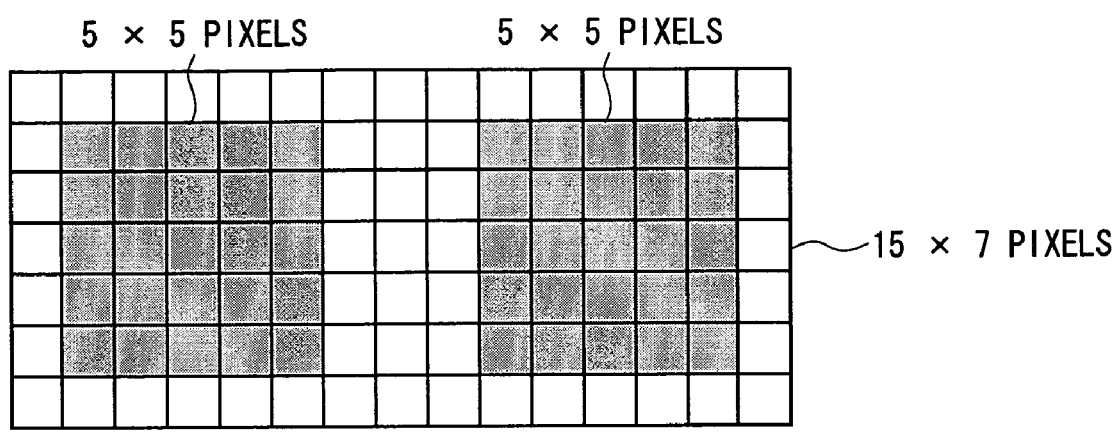
FIG. 23 is an explanatory drawing illustrating how the halftone dot pixel extracting section in FIG. 13 extracts the first halftone dot pixels in FIG. 22.

FIG. 22 is a flowchart illustrating the operation of the halftone dot pixel extracting section 107 in the arrangement example 3. Further, FIG. 23 is an explanatory drawing of the extraction carried out by the halftone dot pixel extracting section 107 with respect to the first halftone dot pixel illustrated in FIG. 22.

In the arrangement example 3, an average density difference of a block having a plurality of pixels is used as a characteristic by which the first halftone dot pixel is extracted (second characteristic). To be specific, an average density difference between blocks having a plurality of pixels in a block is used.

At that time, the halftone dot pixel extracting section 107 extracts blocks having 5×5 pixels in a block having 15×7 pixels for example and centering a current pixel. Next, the halftone dot pixel extracting section 107 calculates an average value of each color component of a pixel in each of the two blocks. Next, with respect to the average density value of each color component, the halftone dot pixel extracting section 107 calculates a difference Psub in the average density value between the two blocks (average density difference between blocks) (S271).

Next, the halftone dot pixel extracting section 107 obtains the max value MaxPsub out of average density differences of each color component between blocks, which average density differences have been calculated in S271 (S272).

Next, the halftone dot pixel extracting section 107 compares the maximum value MaxPsub with a predetermined threshold value Thsub (e.g. 5). When the result of comparison shows that the maximum value MaxPsub is not more than the threshold value Thsub, the halftone dot pixel extracting section 107 judges that the current pixel is the first halftone dot pixel (S274). When the result of the comparison shows that the maximum value MaxPsub is more than the threshold value Thsub, the halftone dot pixel extracting section 107 judges that the current pixel is the second halftone dot pixel (S275).

In this way, by regarding the average density difference between the blocks having a plurality of pixels as the characteristic by which the first halftone dot pixel is extracted, it is possible to suitably extract the first halftone dot pixel. This is because: the first halftone dot pixels (halftone dots) have uniform density (pixel value) and therefore have smaller average density difference between blocks than the second halftone dot pixels.

In the above examples, a halftone dot area is extracted by using the maximum density difference and total density busyness as the first characteristic and the first halftone dot pixel is detected by using, as the second characteristic, (1) the number of image density transition, (2) standard deviation, or (3) average density difference between blocks. However, the present invention may be arranged so that the halftone dot pixel and the first halftone dot pixel are detected by using appropriate combinations of (1), (2), and (3). For example, there is a method in which the halftone dot pixel is extracted by using the number of image density transition and the first halftone dot pixel is extracted by using standard deviation.

Further, in the above embodiments, it is judged whether a pixel belongs to a text area, a halftone dot area, a photographic-picture area (continuous tone area), or a page background area, by using the maximum density difference and the total density busyness. However, as described above, when the halftone dot pixel and the first halftone dot pixel are detected by appropriate combinations of (1) the number of image density transition, (2) standard deviation, or (3) average density difference between blocks, the maximum density difference and the total density busyness are not used for detection of the halftone dot pixel. Therefore, at that time, the present invention may be arranged so that: with respect to image data judged to belong to a text/halftone dot area (S58 in FIG. 14), the result of calculation using an edge-detection filter (such as Sobel filter and Laplacian filter) is compared with a threshold value so that it is judged whether a text edge exists or not, while the number of image density transition is calculated and compared with a threshold value so that it is judged whether a halftone dot pixel exists or not. At that time, on the basis of the results of these judgments, it is possible to perform a final judgment, for example, with reference to Table 1 indicated below.

[Table 1]

Note that, in Table 1, "1" indicates that the characteristic as edges and the characteristic as the number of image density transition are detected. Further, when both the characteristic of edges and the characteristic of the number of image density transition are detected, a pixel is judged to be a halftone dot pixel. Further, regarding a pixel judged to be "unknown", the present invention may be arranged so that the pixel is not subjected to any process.

Alternatively, Embodiment 2 may be arranged so that: just like Embodiment 1, two types of threshold values are set with respect to (1) the number of image density transition, (2) standard deviation, or (3) average density difference between blocks, and the first halftone dot pixel and the second halftone dot pixel are detected, accordingly.

Application Example

Figure 12:
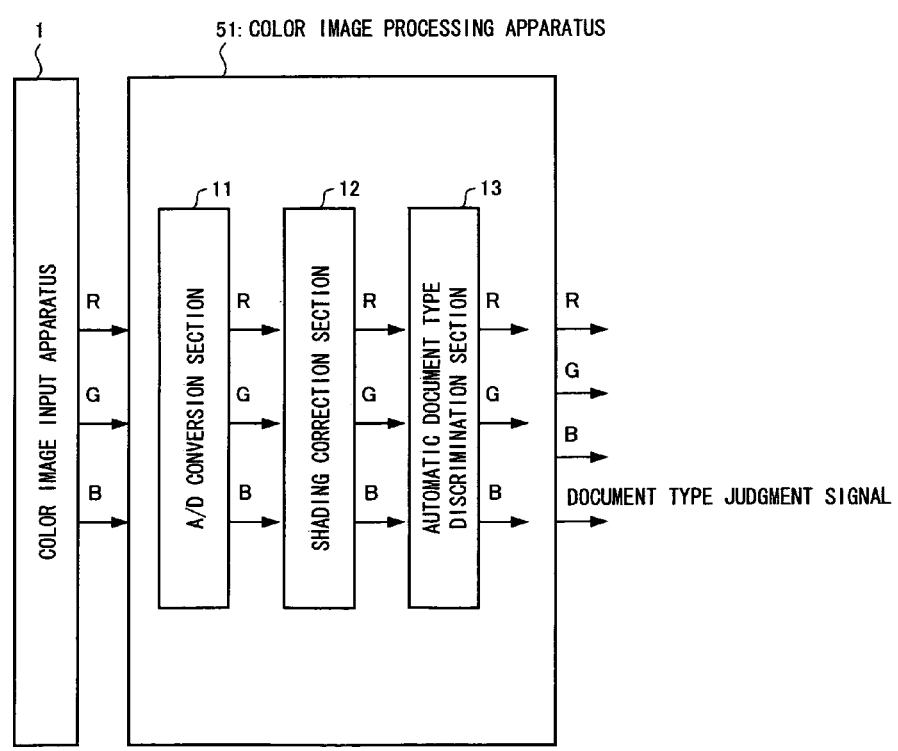
FIG. 12 is a block diagram illustrating an example of an image reading apparatus including the automatic document type discrimination section in FIG. 1.

FIG. 12 is a block diagram illustrating an image reading apparatus (flat bed scanner) to which the arrangement of the present invention is applied.

As illustrated in FIG. 12, the image reading apparatus includes the color image input 1 and a color image processing 51. The color image processing 51 includes the A/D conversion section 11, the shading correction section 12, and the automatic document type discrimination section 13.

The color image input 1 includes a scanner section including a CCD (Charge Coupled Device) for example. The color image input 1 reads a reflective light image from a document as analog RGB signals (red, green, and blue) by use of the CCD, and outputs the analog RGB signals to the color image processing 51.

The analog signals read out by the color image input apparatus 1 are transmitted to each section of the color image processing apparatus 2 in the order of the A/D conversion section 11, the shading correction section 12, and the automatic document type discrimination section 13, and are outputted as digital color signals of RGB to an apparatus such as a personal computer.

The functions of the A/D conversion section 11, the shading correction section 12, and the automatic document type discrimination section 13 have been already explained.

Image data which has been subjected to the above processes is inputted to a computer or a printer. Note that, the above processes are controlled by a CPU (Central Processing Unit) (not shown).

The present invention may be such that: an image processing method for judging the type of a document is stored in a computer-readable storage medium which stores a program to be executed by a computer. As a result, it is possible to provide a storage medium which stores a program for executing the image processing method for judging the type of a document.

In the present embodiment, such a storage medium may be a memory (not shown), such as a ROM, so that the process is executable on a microcomputer. Alternatively, a program medium may be used which can be read by inserting the storage medium in an external storage device (not shown).

In addition, in either of the cases, it is preferable if the contained program is accessible to a microprocessor which will execute the program. Further, it is preferable if the program is read, and the program is then downloaded to a program storage area (not shown) of a microcomputer where the program is executed. Assume that the program for download is stored in a main body device in advance.

In addition, the program medium is a storage medium arranged so that it can be separated from the main body. Examples of such a program medium include a tape, such as a magnetic tape and a cassette tape; a magnetic disc, such as a flexible disc and a hard disc; an optical disc, such as a CD-ROM/MO/MD/DVD; a card, such as an IC card (inclusive of a memory card) and an optical card; and a semiconductor memory, such as a mask ROM, an EPROM (erasable programmable read only memory), an EEPROM (electrically erasable programmable read only memory), or a flash ROM. All these storage media hold a program in a fixed manner.

Alternatively, in the present embodiment, if a system can be constructed which can connects to the Internet or other communications network, it is preferable if the program medium is a storage medium carrying the program in a flowing manner as in the downloading of a program over the communications network. Further, when the program is downloaded over a communications network in this manner, it is preferable if the program for download is stored in a main body device in advance or installed from another storage medium.

The storage medium is read by a program-reading device included in a digital color image forming apparatus or a computer system, so that the image processing method is carried out.

The computer system includes: an image input apparatus such as a flat bed scanner, a film scanner, and a digital camera; a computer to which a predetermined program is downloaded and on which various processes such as the image processing method are performed; an image display device such as a CRT display and a liquid crystal display for displaying the result of processing carried out by the computer; and a printer for outputting the result of processing carried out by the computer onto a paper and other components. Further, the computer system includes a network card, a modem, and other components, which serve as communication means for allowing connection with a server and other components via a network.

As described above, the image processing apparatus according to the present embodiment does not judge all ink-jet and the like output documents (images outputted based on the ink-jet method or the electrophotography method) in automatic judgment of the type of a document. Instead, the image processing apparatus according to the present embodiment merely judges ink-jet and the like output documents (specific-ink-jet and the like output documents) which are not excellently reproduced in a conventional document mode. As a result, it is possible to enhance recognition accuracy and image quality. Further, the method of judgment is such that: in judging halftone dot pixels (pixels constituting a halftone dot area), two threshold values are used, the number of first halftone dot pixels (halftone dots) used only in the halftone printing document and the number of second halftone dot pixels included in the ink-jet and the like output document are counted, and the results of counting are compared with the threshold values, thereby discriminating a specific printing document.

The image processing apparatus according to the present embodiment does not perform a segmentation process with respect to a document judged to be a specific ink-jet and the like output document but perform a single process with respect to the whole image, thereby preventing deterioration in image quality. Namely, so far, a segmentation process is performed with respect to a document image. For example, with respect to an area judged to be a halftone dot area, a process for blurring an image is performed so as to suppress moire. With respect to an area judged to be a photographic paper area, a process for sharpening the outline of an image is performed. As a result, if a conventional segmentation process is performed with respect to an image of a specific ink-jet and the like output document and different processes are performed with respect to each area, then an image on respective areas has borderlines on parts where borderlines do not originally exist, so that image quality is deteriorated. With the image processing apparatus according the present embodiment, such problem does not occur.

The present invention is applicable to an apparatus necessary for judgment of the type of a document, such as a color copying machine, a flat bed scanner, a film scanner, and a digital camera.

As described above, The image processing apparatus according to the present invention may be arranged so that the discrimination means includes: a characteristic extracting section for extracting characteristic regarding each of the plural types of halftone dot areas from the image data; a threshold value setting section for setting (i) a first threshold value regarding the characteristic and (ii) a second threshold value regarding the characteristic and being more unconfined than the first threshold value; a first halftone dot pixel detection section for comparing the characteristic extracted by the characteristic extracting section with the first threshold value so as to detect first halftone dot pixels from the image data; a second halftone dot pixel detection for comparing the characteristic extracted by the characteristic extracting section with the second threshold value so as to detect second halftone dot pixels from the image data; and a type determination section for determining the type of the image data on the basis of the number of the first halftone dot pixels and the number of the second halftone dot pixels in the image data.

With the arrangement, the characteristic extracting section extracts the characteristic regarding each of the plural types of halftone dot areas from the image data. The first halftone dot pixel detection section compares the characteristic extracted by the characteristic extracting section with the first threshold value so as to detect the first halftone dot pixels from the image data. The second halftone dot pixel detection compares the characteristic extracted by the characteristic extracting section with the second threshold value regarding the characteristic and being more unconfined than the firs threshold value, so as to detect second halftone dot pixels from the image data. The type determination section determines the type of the image data on the basis of the number of the first halftone dot pixels and the number of the second halftone dot pixels in the image data.

As a result, it is possible to detect, as a halftone dot area, not only a halftone printing area but also a halftone dot area of an image outputted by an ink-jet printer or an image forming apparatus adopting the electrophotography method. Therefore, it is possible to exactly detect the type of image data (document from which the image data is read).

The image processing apparatus may be arranged so that: the second halftone dot pixel detection section includes a judgment result correction section for correcting a result of judgment regarding a pixel judged by the second threshold value not to belong to the second halftone dot pixels, the correction being performed on the basis of a result of judgment regarding pixels existing around the pixel.

With the arrangement, the judgment result correction section corrects the result of judgment regarding a pixel judged by the second threshold value not to belong to the second halftone dot pixels, the correction being performed on the basis of the result of judgment regarding pixels existing around the pixel. In this way, the judgment result correction section corrects the result of judgment carried out by the second halftone dot pixel detection section, by using area information, namely, pixels existing around the pixel, so that pixels difficult to be recognized as pixels constituting a halftone dot area, such as pixels having low-density or high-density, or pixels having high frequency halftone or low frequency halftone, can be recognized with sureness. Therefore, it is possible to further exactly detect the type of the image data.

The image processing apparatus may be arranged so that: the characteristic is obtained by extracting, from the image data, (i) density differences and (ii) busyness indicative of total sum of the density differences between adjacent pixels.

With the arrangement, appropriate and easily obtainable indices such as density differences and busyness are used as the characteristics by which whether the halftone dot area exists or not in the image data is detected. As a result, it is easy to detect the halftone dot area.

The image processing apparatus may be arranged so that: the first characteristic is obtained by extracting, from the image data, (i) density differences and (ii) busyness indicative of total sum of the density differences between adjacent pixels.

With the arrangement, appropriate and easily obtainable indices such as density differences and busyness are used as the first characteristics by which whether the halftone dot area exists or not in the image data is detected. As a result, it is easy to detect the halftone dot area.

The image processing apparatus may be arranged so that: the second characteristic is the number of image density transition in a block having a plurality of pixels and centering a current pixel.

With the arrangement, the number of image density transition is the characteristic by which the first halftone dot pixels are detected, so that it is possible to appropriately extract the first halftone dot pixels. This is because: the first halftone dot pixels (halftone dots) have sharp contrast in density, while the second halftone dot pixels outputted by an ink-jet image forming apparatus (printer, copying machine, or multifunction printer) do not have sharp contrast in density. Namely, by setting the threshold value for extracting the first halftone dot pixels to a value larger than the range of change in contrast of the second halftone dot pixels, it is possible to suitably extract the first halftone dot pixels.

The image processing apparatus may be arranged so that: the second characteristic is a standard deviation of pixel values in a block having a plurality of pixels and centering a current pixel.

With the arrangement, the standard deviation of pixel values in the block having a plurality of pixels and centering a current pixel is used as the characteristic for detecting the first halftone dot pixels, so that it is possible to appropriately extract the first halftone dot pixels. This is because: the first halftone dot pixels (printing halftone dots) have sharp contrast in density and therefore have larger standard deviation than the second halftone dot pixels which do not have sharp contrast in density.

The image processing apparatus may be arranged so that: the second characteristic is an average density difference of a block having a plurality of pixels and centering a current pixel.

With the arrangement, the average density difference of the block having a plurality of pixels and centering a current pixel is used as the characteristic for detecting the first halftone dot pixels, so that it is possible to appropriately extract the first halftone dot pixels. This is because: the first halftone dot pixels (halftone dots) have uniform density (pixel value) and therefore have smaller average density difference between blocks than the second halftone dot pixels.

The image processing apparatus may be arranged so that: the type determination section determines the type of the image data on the basis of a ratio of the first halftone dot pixels to the second halftone dot pixels.

With the arrangement, the type of the image data is determined by using an easily obtainable index such as the ratio of the first halftone dot pixel to the second halftone dot pixel, so that it is easy to determine the type of the image data.

The image processing apparatus may be arranged so that: the first halftone dot pixels are halftone dot pixels belonging to a halftone printing picture area, the second halftone dot pixels include at least one of (i) the halftone dot pixels which belong to the halftone printing picture area and (ii) third halftone dot pixels which belong to neither the halftone printing picture area nor a photographic-picture area, and the type determination section judges whether the third halftone dot pixels exist or not in the image data when the type of the image data is determined.

With the arrangement, it is possible to judge whether or not a special area, namely, the third halftone dot area which belong to neither the halftone printing picture area nor the photographic -picture area exists, so that it is possible to perform the best process which prevents deterioration in image quality, with respect to the image data having such a special area.

The image processing apparatus may be arranged so that: when the type determination section of the judgment section determines that the image data includes the third halftone dot pixels, a single process is performed with respect to a whole area of the image data.

With the arrangement, with respect to image data having a special area, namely, the third halftone dot area which belongs to neither the halftone printing picture area nor the photographic -picture area, a single process is performed without performing a segmentation process to the whole area of the image data. As a result, it is possible to perform the best process which prevents deterioration in image quality, with respect to the image data having such a special area.

The image reading apparatus according to the present invention includes any one of the above image processing apparatuses.

With the arrangement, it is possible to recognize a specific ink-jet output document image (specific image outputted by an image forming apparatus adopting the ink-jet method or the electrophotography method) which cannot be classified by conventional document modes such as a halftone printing picture image and a photographic-picture image, and to perform the best process with respect to the specific ink-jet output document image, so that it is possible to provide an image reading apparatus capable of forming high-quality image data from the document.

The image forming apparatus according to the present invention includes any one of the above image processing apparatuses.

With the arrangement, it is possible to recognize a specific ink-jet output document image (specific image outputted by an image forming apparatus adopting the ink-jet method or the electrophotography method) which cannot be classified by conventional document modes such as a halftone printing picture image and a photographic-picture image, and to perform the best process with respect to the specific ink-jet output document image, so that it is possible to provide an image forming apparatus capable of outputting high-quality image.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

[EQUATION 1]

$$\sigma^2 = \frac{1}{n}\sum_{i=1}^{n}(Pi - \overline{P})^2 \quad (1)$$

$n$ : NUMBER OF PIXELS
$Pi$ : PIXEL VALUE
$\overline{P}$ : AVERAGE VALUE OF PIXEL VALUES IN BLOCK

TABLE 1

| EDGE-DETECTION FILTER | NUMBER OF DENSITY TRANSITION | JUDGMENT |
|---|---|---|
| 1 | 0 | TEXT |
| 0 | 1 | HALFTONE DOT PIXEL |
| 1 | 1 | HALFTONE DOT PIXEL |
| 0 | 0 | UNKNOWN |

What is claimed is:

1. An image processing apparatus, comprising discrimination means for estimating a type of input image data, wherein
   the discrimination means is capable of detecting whether each of plural types of halftone dot areas exists or not in the image data, by using a threshold value, regarding same characteristics, which is set with respect to each of the plural types of halftone dot areas, and the discrimination means estimates the type of the image data on the basis of a result of the detection.

2. The image processing apparatus as set forth in claim 1, wherein
   the discrimination means includes:
   a characteristic extracting section for extracting a characteristic regarding each of the plural types of halftone dot areas from the image data;
   a threshold value setting section for setting (i) a first threshold value regarding the characteristic and (ii) a second threshold value regarding the characteristic and being more unconfined than the first threshold value;
   a first halftone dot pixel detection section for comparing the characteristic extracted by the characteristic extracting section with the first threshold value so as to detect first halftone dot pixels from the image data;
   a second halftone dot pixel detection section for comparing the characteristic extracted by the characteristic extracting section with the second threshold value so as to detect second halftone dot pixels from the image data; and
   a type determination section for determining a type of the image data on the basis of the number of the first halftone dot pixels and the number of the second halftone dot pixels in the image data.

3. The image processing apparatus as set forth in claim 2, wherein
   the second halftone dot pixel detection section includes a judgment result correction section for correcting a result of judgment regarding a pixel judged, by the second threshold value, not to belong to the second halftone dot pixels, the correction being performed on the basis of a result of judgment regarding pixels existing around the pixel.

4. The image processing apparatus as set forth in claim 2, wherein the characteristic is obtained by extracting, from the image data, (i) density differences and (ii) busyness indicative of total sum of the density differences between adjacent pixels.

5. The image processing apparatus as set forth in claim 2, wherein the type determination section determines the type of image data on the basis of a ratio of the first halftone dot pixels to the second halftone dot pixels.

6. The image processing apparatus as set forth in claim 2, wherein
- the first halftone dot pixels are halftone dot pixels belonging to a halftone printing picture area, the second halftone dot pixels include at least one of (i) the halftone dot pixels which belong to the halftone printing picture area and (ii) third halftone dot pixels which belong to neither the halftone printing picture area nor a photographic-picture area, and
- the type determination section judges whether the third halftone dot pixels exist or not in the image data when the type of the image data is determined.

7. The image processing apparatus as set forth in claim 6, wherein:
- when the type determination section of the discrimination means estimates that the image data includes the third halftone dot pixels, a single process is performed with respect to a whole area of the image data.

8. An image reading apparatus, comprising an image processing apparatus which includes discrimination means for estimating a type of input image data, wherein
- the discrimination means is capable of detecting whether each of plural types of halftone dot areas exists or not in the image data, by using a threshold value, regarding same characteristics, which is set with respect to each of the plural types of halftone dot areas, and the discrimination means estimates the type of the image data on the basis of a result of the detection.

9. An image forming apparatus, comprising an image processing apparatus which includes discrimination means for estimating a type of input image data, wherein
- the discrimination means is capable of detecting whether each of plural types of halftone dot areas exists or not in the image data, by using a threshold value, regarding same characteristics, which is set with respect to each of the plural types of halftone dot areas, and the discrimination means estimates the type of the image data on the basis of a result of the detection.

10. A computer-readable storage medium for storing a program for causing an image processing apparatus to operate, said image processing apparatus including discrimination means for estimating a type of input image data, wherein
- the discrimination means is capable of detecting whether each of plural types of halftone dot areas exists or not in the image data, by using a threshold value, regarding same characteristics, which is set with respect to each of the plural types of halftone dot areas, and the discrimination means estimates the type of the image data on the basis of a result of the detection,
- said program causing a computer to function as the discrimination means.

11. A method for processing an image, comprising the step of judging a type of input image data, wherein
- in the step, it is detected whether plural types of halftone dot areas exist or not in the image data on the basis of a threshold value, regarding same characteristics, which is set with respect to each of the plural types of halftone dot areas, and the type of the image data is judged on the basis of a result of the detection.

* * * * *